(12) United States Patent
Sannomiya et al.

(10) Patent No.: US 12,515,124 B2
(45) Date of Patent: Jan. 6, 2026

(54) ELECTRONIC APPARATUS AND LIGHT GUIDING MEMBER

(71) Applicant: Sony Interactive Entertainment Inc., Tokyo (JP)

(72) Inventors: Ryu Sannomiya, Tokyo (JP); Takeshi Igarashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 308 days.

(21) Appl. No.: 18/188,573

(22) Filed: Mar. 23, 2023

(65) Prior Publication Data

US 2023/0310982 A1 Oct. 5, 2023

(30) Foreign Application Priority Data

Apr. 5, 2022 (JP) ................................. 2022-062960

(51) Int. Cl.
*A63F 13/24* (2014.01)
*A63F 13/26* (2014.01)
(Continued)

(52) U.S. Cl.
CPC ............ *A63F 13/26* (2014.09); *G02B 6/0055* (2013.01); *A63F 13/28* (2014.09); *A63F 2300/1068* (2013.01)

(58) Field of Classification Search
None
See application file for complete search history.

(56) References Cited

U.S. PATENT DOCUMENTS 11,308,295 B2 * 4/2022 Kubota .............. G06K 7/10801
2012/0170310 A1 * 7/2012 Bita ...................... G02B 6/0065
362/613
(Continued)

FOREIGN PATENT DOCUMENTS

AU 2020103100 A4 1/2021
EP 2460569 A2 6/2012
(Continued)

OTHER PUBLICATIONS

Extended European Search Report for corresponding EP Application No. 23163762.0, 12 pages, dated Aug. 2, 2023.
(Continued)

*Primary Examiner* — Sunit Pandya
(74) *Attorney, Agent, or Firm* — Fish & Richardson P.C.

(57) ABSTRACT

Provided is an electronic apparatus including a light source, a light emitting section that emits light from the light source to outside of the electronic apparatus, and a light guiding member including a light guiding section and a light shielding section formed by two-color molding. The light guiding section has a light receiving section that receives the light from the light source, a light output section that outputs the light toward the light emitting section, and a light transmitting section extending from the light receiving section toward the light output section, the light shielding section has a first opening, an inner peripheral edge of the first opening is in contact with a first section that is one of the light receiving section and the light output section, and the light transmitting section has an exterior surface.

16 Claims, 15 Drawing Sheets

(51) Int. Cl.
*F21V 8/00* (2006.01)
*A63F 13/28* (2014.01)

(56) References Cited

U.S. PATENT DOCUMENTS

| | | | |
|---|---|---|---|
| 2017/0173453 | A1 | 6/2017 | Huang |
| 2021/0299554 | A1* | 9/2021 | Kobayashi .............. G06F 3/033 |
| 2023/0078594 | A1* | 3/2023 | Ishihara ................. B41J 29/13 |
| | | | 362/613 |

FOREIGN PATENT DOCUMENTS

| | | |
|---|---|---|
| EP | 2908224 A1 | 8/2015 |
| EP | 3254737 A1 | 12/2017 |
| JP | 2016091806 A | 5/2016 |
| WO | 2007129432 A1 | 11/2007 |
| WO | 2021200076 A1 | 10/2021 |

OTHER PUBLICATIONS

Notice of Reasons for Refusal for corresponding JP Application No. 2022-062960, 8 pages, dated Mar. 25, 2024.

\* cited by examiner

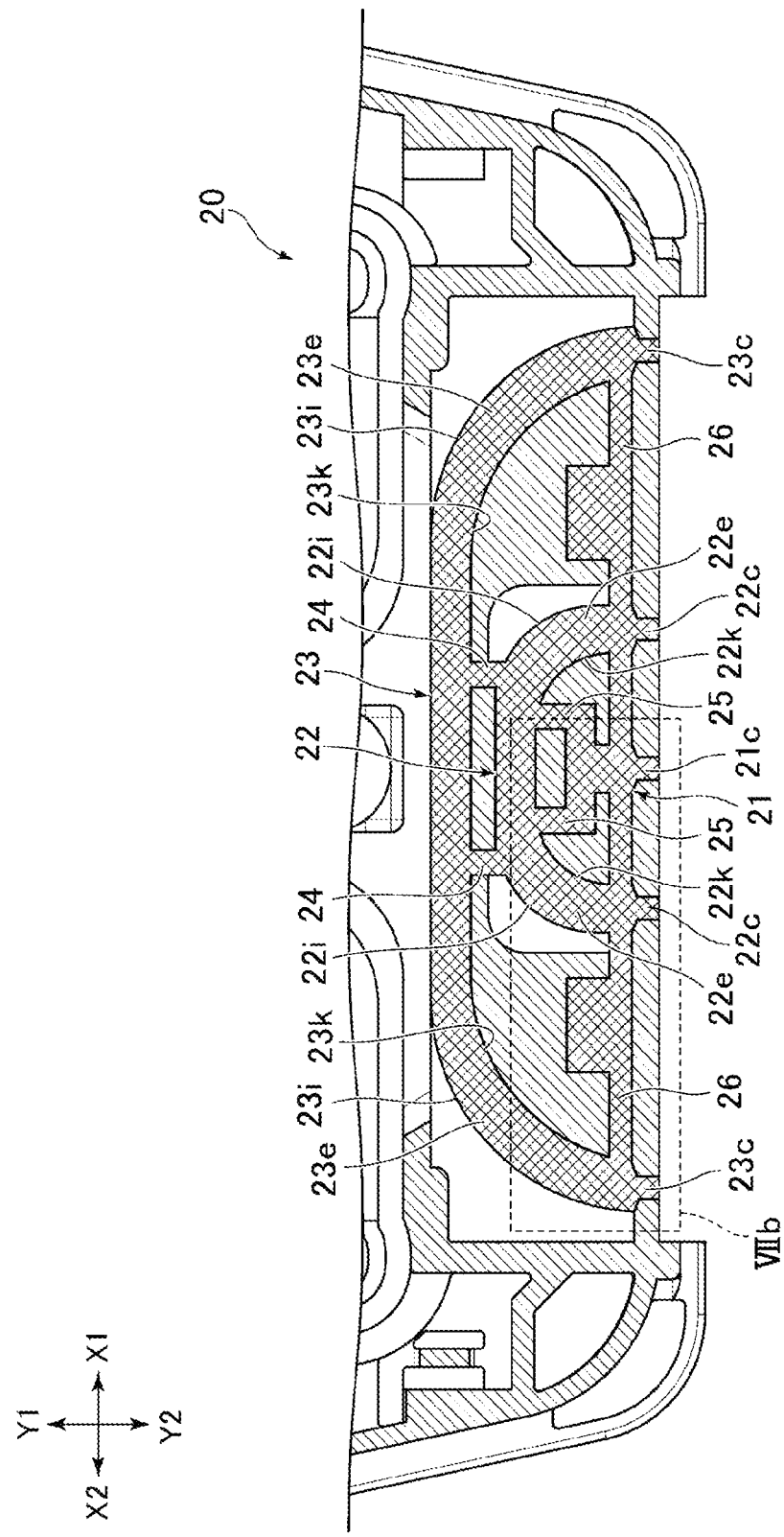

ELECTRONIC APPARATUS AND LIGHT GUIDING MEMBER

CROSS REFERENCE TO RELATED APPLICATION

This application claims the benefit of Japanese Priority Patent Application JP 2022-062960 filed Apr. 5, 2022, the entire contents of which are incorporated herein by reference.

BACKGROUND

The present disclosure relates to an electronic apparatus including a light emitting section and a light guiding member.

Some input devices for information processing apparatuses such as video game consoles have an exterior surface with a plurality of light emitting regions. The light emitting regions are used to present, to the user, the status of the input device, a situation in a video game being executed by the information processing apparatus, and the like. Such an input device includes, inside thereof, light sources (light emitting diodes (LEDs) in general) and light guiding members configured to guide light from the light sources to the light emitting regions provided on the exterior surface of the input device. Further, inside the input device, a light shielding member configured to prevent light leakage to an unintended region is disposed in some cases. Such a structure is used for various electronic apparatuses such as video game consoles themselves and audiovisual apparatuses, other than input devices.

SUMMARY

In designing an electronic apparatus such as an input device, it is desired to make the light emitting regions emit light efficiently with the brightness intended by the designer. However, the instability of the size of the gap formed between the light guiding members and the light shielding member due to the tolerances of the members affects the luminance of the light emitting regions in some cases. As a result, the light emitting regions do not emit light with the intended luminance in some cases.

According to an embodiment of the present disclosure, there is proposed an electronic apparatus including a light source, a light emitting section configured to emit light from the light source to outside of the electronic apparatus, and a light guiding member including a light guiding section and a light shielding section that are formed by two-color molding. The light guiding section has a light receiving section configured to receive the light from the light source, a light output section configured to output the light toward the light emitting section, and a light transmitting section extending from the light receiving section toward the light output section. The light shielding section has formed therein a first opening, and an inner peripheral edge of the first opening is in contact with a first section that is one of the light receiving section and the light output section. The light transmitting section has an exterior surface extending in an extending direction of the light transmitting section and exposed from the light shielding section. With this structure, the instability of the size of the gap between the light guiding section and the light shielding section can be overcome, with the result that the luminance of the light emitting region can be stable. Further, light from the light source can be guided efficiently from the light receiving section to the light output section.

According to an embodiment of the present disclosure, there is proposed a light guiding member including a light guiding section and a light shielding section. The light guiding section and the light shielding section are formed by two-color molding. The light guiding section has a light receiving section configured to receive light from a light source, a light output section configured to output the light toward a light emitting section, and a light transmitting section extending from the light receiving section toward the light output section. The light shielding section has formed therein a first opening, and an inner peripheral edge of the first opening is in contact with a first section that is one of the light receiving section and the light output section. The light transmitting section has an exterior surface extending in an extending direction of the light transmitting section and exposed from the light shielding section. With this structure, the instability of the size of the gap between the light guiding section and the light shielding section can be overcome, with the result that the luminance of the light emitting region can be stable. Further, light from the light source can be guided efficiently from the light receiving section to the light output section.

BRIEF DESCRIPTION OF THE DRAWINGS

FIG. 7A is a sectional view taken along line VIIa-VIIa illustrated in FIG. 5;

DETAILED DESCRIPTION OF THE PREFERRED EMBODIMENTS

Figure 1A:
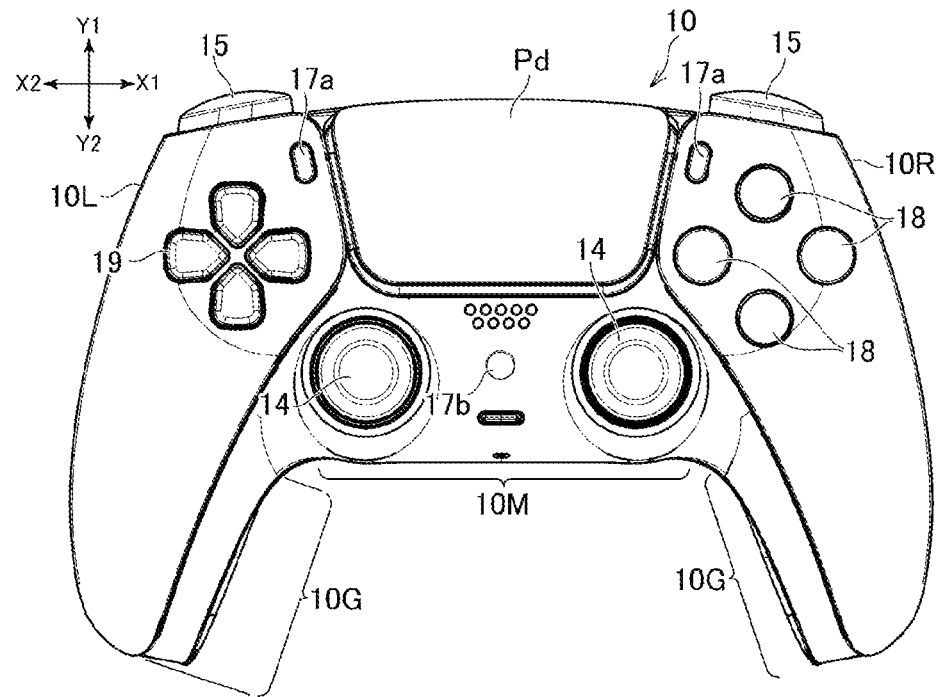
FIG. 1A is a plan view illustrating an input device as an example of an electronic apparatus proposed by an embodiment of the present disclosure.
Figure 1B:
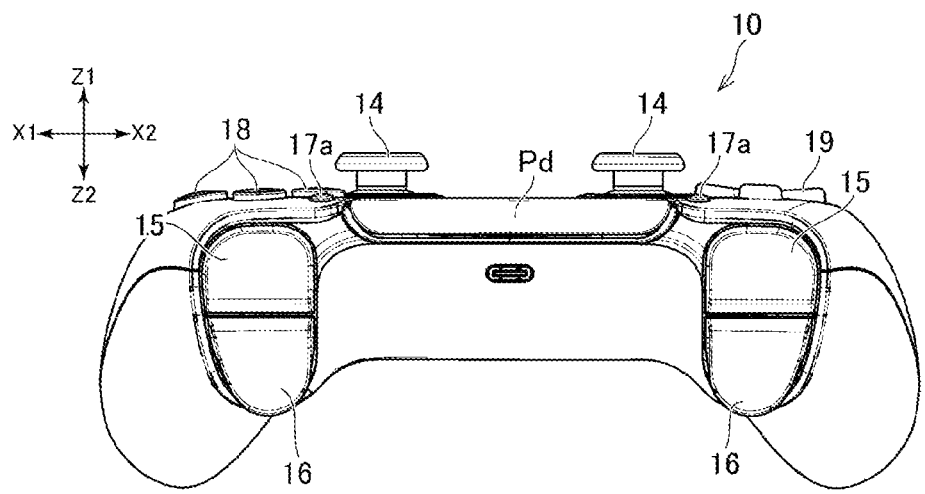
FIG. 1B is a plan view of the input device illustrated in FIG. 1A.

Now, an electronic apparatus proposed in an embodiment of the present disclosure is described with reference to the drawings. FIG. 1A is a plan view of an input device 10 that is an example of the electronic apparatus proposed by an embodiment of the present disclosure. FIG. 1B is a front view of the input device 10. The input device 10 is an apparatus for inputting a user instruction operation to a video game console, for example. FIG. 2 to FIG. 12B are diagrams illustrating an input pad Pd included in the input device 10.

In the following description, X1 and X2 illustrated in FIG. 1A indicate the right direction and the left direction, respectively, Y1 and Y2 illustrated in FIG. 1A indicate the front direction and the rear direction, respectively, and Z1 and Z2 illustrated in FIG. 1B indicate the up direction and the down direction, respectively. These directions are defined for the description of the shapes and relative positional relations of the elements (parts, members, and sections) of the input device 10 and are not intended to limit the posture of the input device 10 in use.

As illustrated in FIG. 1A, the input device 10 includes, in its left portion and right portion, a left held section 10L and a right held section 10R, respectively, that the user holds with his/her hands. The input device 10 includes a device center section 10M between the held sections 10L and 10R. The held sections 10L and 10R each include a grip 10G extending rearward over the rear edge of the device center section 10M. Unlike this, the rear edge of the device center section 10M may reach the positions of the rear ends of the held sections 10L and 10R.

The input device 10 includes a plurality of input members that the user operates with his/her fingers. As illustrated in FIG. 1A, for example, four input buttons 18 are disposed on the upper surface of the front portion of the right held section 10R, and a cross-shaped directional pad (cross button) 19 is disposed on the upper surface of the front portion of the left held section 10L. The input device 10 may include left and right input buttons 17a and an input button 17b disposed at the center in the left-right direction of the input device 10. Further, the input device 10 may include, as illustrated in FIG. 1B, input buttons 15 and trigger buttons 16 on the front surfaces of the held sections 10R and 10L.

As illustrated in FIG. 1A, the input device 10 may include input sticks 14. The input sticks 14 are disposed in the right and left portions of the device center section 10M, for example. The input stick 14 can tilt in its radial direction or tilt and pivot around the center line of the initial position. The input stick 14 may be supported to be vertically movable, thereby functioning as a button. The input stick 14 may be slidable in its radial direction instead of being tiltable in the radial direction.

Further, the input device 10 includes the input pad Pd as an exemplary input member that the user operates with his/her fingers. The input pad Pd is disposed on the front side of the left and right input sticks 14 and between the input buttons 18 and the directional pad 19 as illustrated in FIG. 1A, for example. The position of the input pad Pd is not limited to this.

[Configuration of Input Pad]

Figure 2:
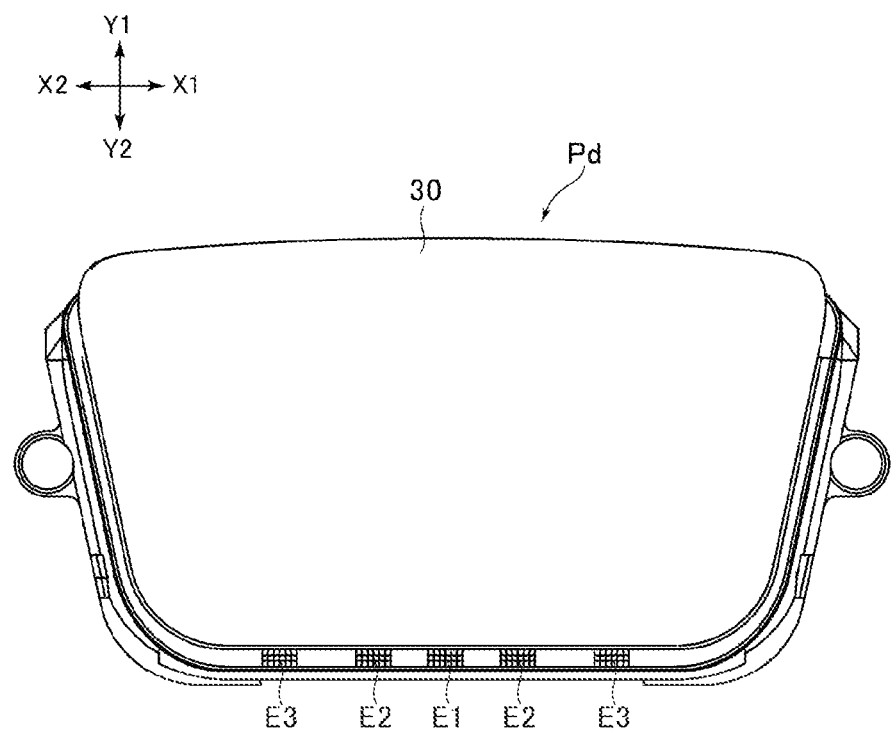
FIG. 2 is a plan view of an input pad included in the input device illustrated in FIG. 1A.

The input device 10 includes a plurality of light emitting sections E1, E2, and E3 as illustrated in FIG. 2. The light emitting sections E1, E2, and E3 are provided along the outer edge of the input pad Pd, for example. In the example illustrated in FIG. 2, the light emitting sections E1, E2, and E3 are provided along the rear edge of the input pad Pd. As illustrated in FIG. 2, the input device 10 may include the single first light emitting section E1 and the two second light emitting sections E2, for example. The first light emitting section E1 is disposed between the two second light emitting sections E2, for example. The input device 10 may include the two third light emitting sections E3. The first light emitting section E1 and the two second light emitting sections E2 may be disposed between the two third light emitting sections E3, for example.

Figure 3:
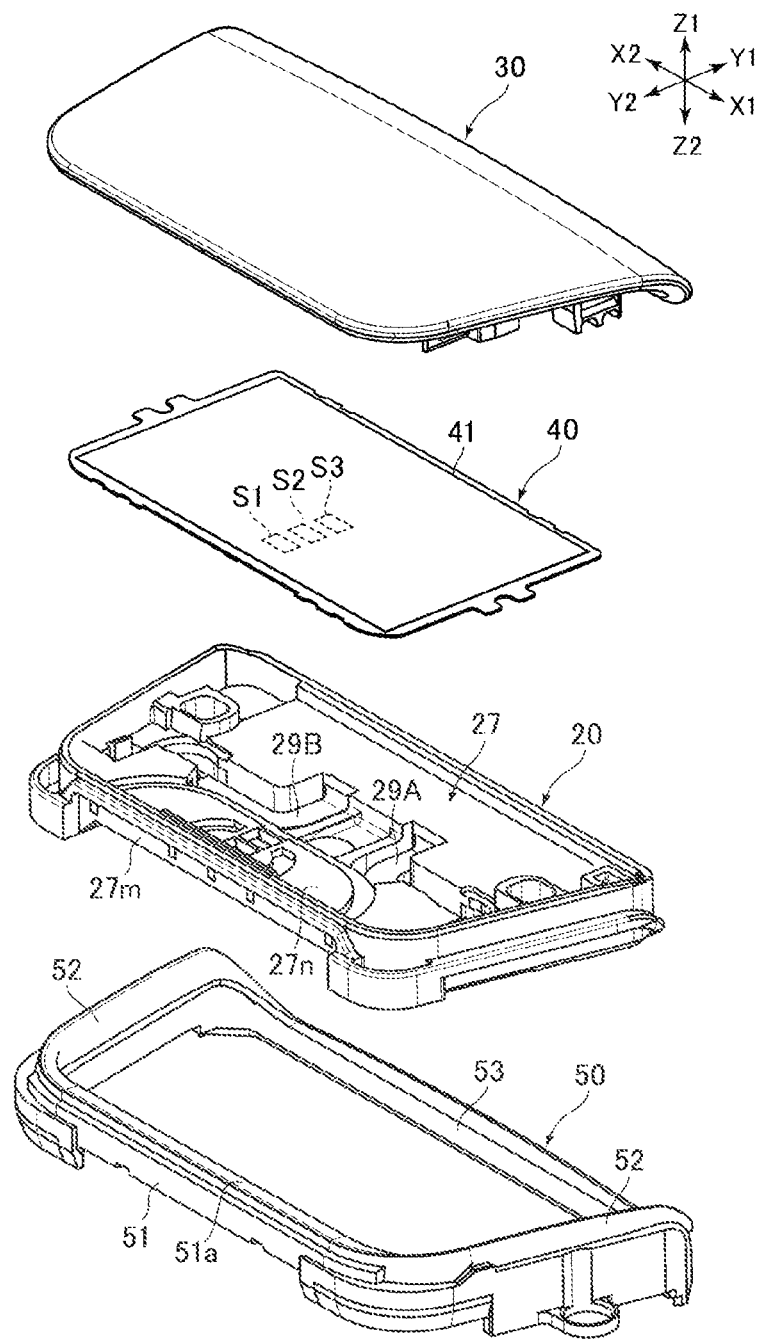
FIG. 3 is an exploded perspective view of the input pad.

The input device 10 includes a plurality of light sources S1, S2, and S3 (see FIG. 3). The first light source S1 may be a light source for the first light emitting section E1, the second light source S2 may be a light source for the two second light emitting sections E2, and the third light source S3 may be a light source for the two third light emitting sections E3. Light from the respective light sources S1, S2, and S3 is transmitted to the light emitting section E1, E2, or E3 through a light guiding section 21, 22, or 23 formed in a light guiding frame 20. The light guiding frame 20 is described in detail later.

The plurality of (five in the example illustrated in FIG. 2) light emitting sections E1 to E3 may emit light in reference to information received by the input device 10 from an information processing apparatus (for example, a video game console).

For example, the plurality of light emitting sections E1 to E3 may emit light in reference to identification information assigned to the input device 10 by the information processing apparatus. For example, in a case where two input devices 10 are used at the same time, "1" may be assigned to the first input device 10 as identification information, and "2" may be assigned to the second input device 10 as identification information. Further, of the plurality of light emitting sections E1, E2, and E3, as many light emitting sections as indicated by the number based on the identification information may emit light. For example, in the case where "1" is assigned as identification information, only the first light emitting section E1 at the center may emit light. In the case where "2" is assigned as identification information, only the two second light emitting sections E2 may emit light.

In a case where three input devices 10 are used, "1" to "3" may be assigned to the respective three input devices 10 as identification information. In a similar manner, in a case where four input devices 10 are used, "1" to "4" may be assigned to the respective four input devices 10 as identification information, and in a case where five input devices 10 are used, "1" to "5" may be assigned to the respective five input devices 10 as identification information. Further, in a case where "3" is assigned as identification information, the first light emitting section E1 and the two second light emitting sections E2 (or the two third light emitting sections E3) may emit light. In the case where "4" is assigned as identification information, the two second light emitting sections E2 and the two third light emitting sections E3 may emit light. In the case where "5" is assigned as identification information, the first light emitting section E1, the two second light emitting sections E2, and the two third light emitting sections E3 may emit light.

The user checks how many of the light emitting sections E1, E2, and E3 are emitting light, thereby being capable of recognizing what number has been assigned to his/her input device 10. Such light emission control may be executed by a control unit 11 (see FIG. 15A) included in the input device 10.

Note that, the use of the light emitting sections E1, E2, and E3 is not limited to the presentation of such identification information. For example, the light emitting sections E1, E2, and E3 may emit light to present the status of the input device 10 (for example, the occurrence of an error or remaining battery), the communication status between the input device 10 and the information processing apparatus (video game console), a situation in a video game being executed by the information processing apparatus, or the reception of chat messages from friends (other video game users).

As illustrated in FIG. 3, the input pad Pd includes an exterior plate 30, the light guiding frame 20, a circuit board 40, and a light diffusing member 50.

[Circuit Board and Exterior Plate]

The exterior plate 30 forms the exterior surface of the input device 10. As illustrated in FIG. 3, the exterior plate 30 is disposed in the uppermost portion of the input pad Pd to form the upper surface of the input device 10, for example.

The circuit board 40 is mounted on the lower surface of the exterior plate 30. The light sources S1, S2, and S3 are implemented on the lower surface of the circuit board 40. The light sources S1, S2, and S3 are LEDs. The plurality of light sources S1, S2, and S3 may each include LEDs of three colors of red, green, and blue. With this, the light emitting sections E1, E2, and E3 can emit light of various colors including white light. Unlike this, the plurality of light sources S1, S2, and S3 may each include any of LEDs of three colors of red, green, and blue. In this case, the light emitting sections E1, E2, and E3 can each emit monochromatic light. A touch sensor 41 for detecting the position of the user's finger may be formed on the upper surface of the circuit board 40. Where on the surface (upper surface) of the exterior plate 30 the user touches with his/her finger can be detected by the touch sensor 41.

As illustrated in FIG. 3, the light guiding frame 20 is disposed under the circuit board 40. The light guiding frame 20 may be mounted on the exterior plate 30 with screws or adhered to the exterior plate 30.

[Light Diffusing Member]

As illustrated in FIG. 3, the light diffusing member 50 may have a frame shape surrounding the light guiding frame 20, for example. The light diffusing member 50 may have a rear section 51 that is disposed along the rear edge of the light guiding frame 20, left and right side sections 52 that are disposed along the respective left and right edges of the light guiding frame 20, and a front section 53 that is disposed along the front edge of the light guiding frame 20.

An upper surface 51a of the rear section 51 functions as a light emitting region including the light emitting sections E1, E2, and E3 described above. Light from the light sources S1, S2, and S3 enters the rear section 51 through the light guiding section 21, 22, or 23 of the light guiding frame 20. The light diffusing member 50 is formed of a light transmissive material having mixed therewith minute particles that reflect light. Light that has entered the light diffusing member 50 is diffusely reflected inside the light diffusing member 50 to be emitted from the upper surface 51a of the light diffusing member 50 (light emitting section E1, E2, or E3).

The shape of the light diffusing member 50 is not necessarily the frame shape illustrated in FIG. 3 and the like, and may be any shape with a region for including the light emitting sections E1, E2, and E3. For example, the light diffusing member 50 may have a rod shape to be disposed along the rear edge of the light guiding frame 20.

[Light Guiding Frame (Light Guiding Member)]

Figure 4:
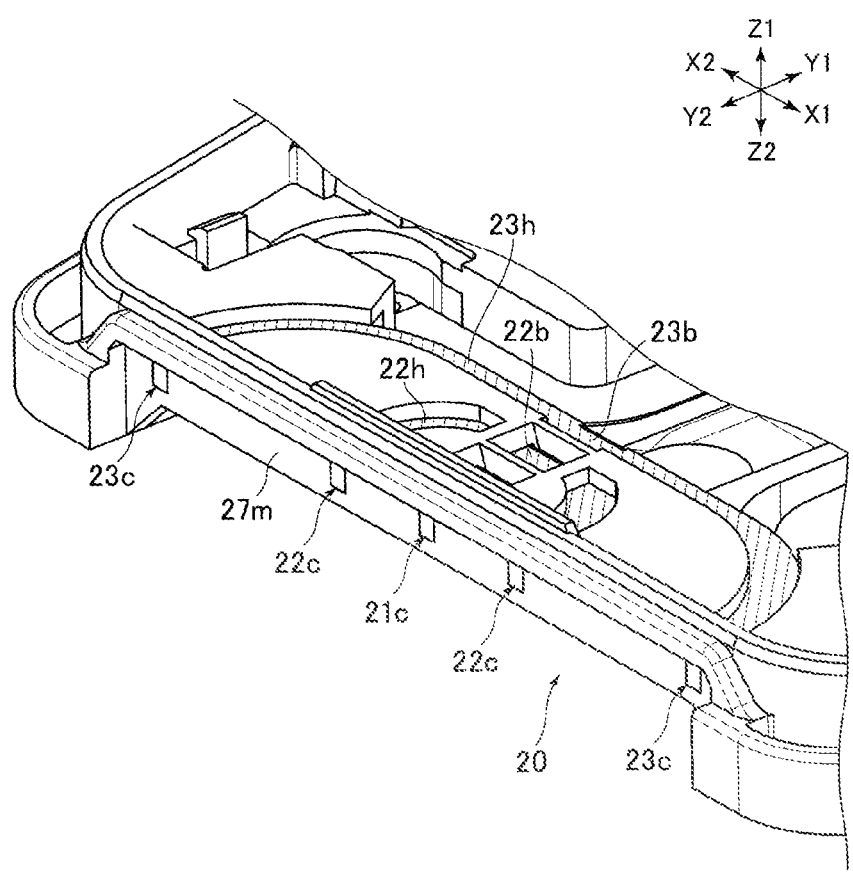
FIG. 4 is a perspective view of a light guiding frame of the input pad.
Figure 6:
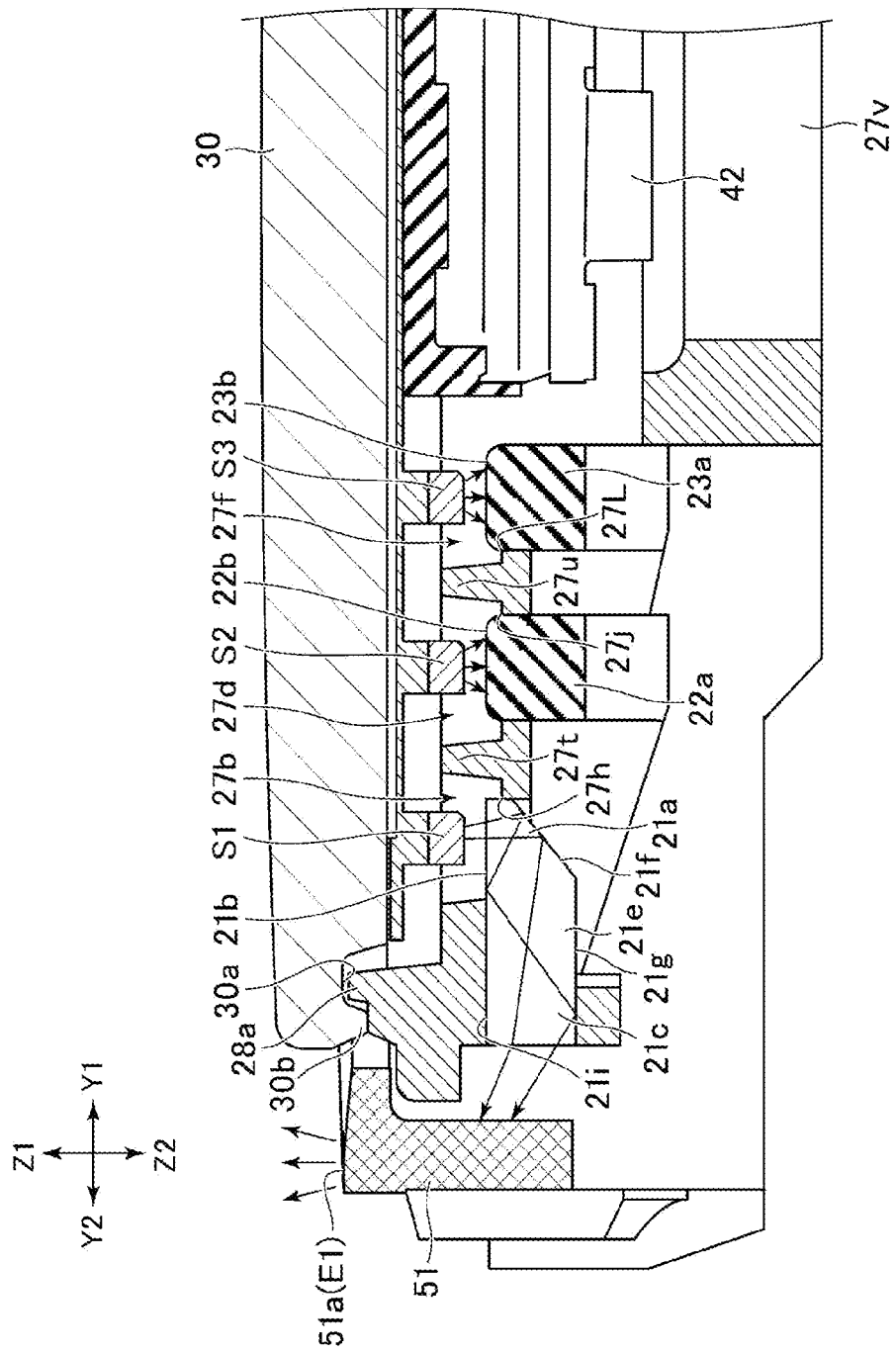
FIG. 6 is a sectional view taken along line VI-VI illustrated in FIG. 5.
Figure 8:
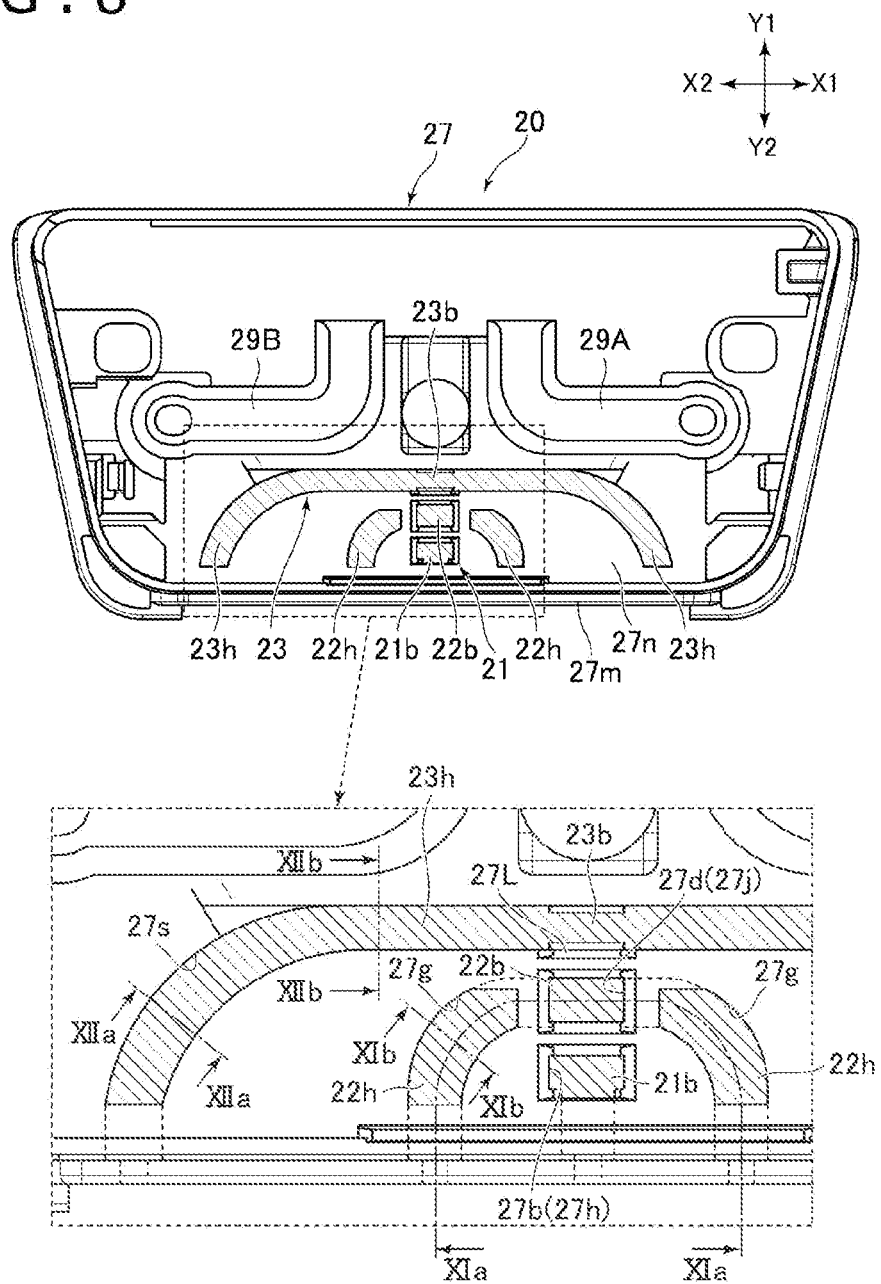
FIG. 8 is a plan view of the light guiding frame, in which the upper surfaces of light guiding sections are shaded.

As illustrated in FIG. 4, FIG. 6, and FIG. 8, the light guiding frame 20 has the light guiding sections 21, 22, and 23 and a light shielding section 27. In FIG. 4 and FIG. 8, the shaded areas represent the surfaces of the light guiding sections 21, 22, and 23. The light guiding sections 21, 22, and 23 are sections configured to guide light from the light source S1, S2, or S3 to the light emitting section E1, E2, or E3 and formed of resin having optical transparency. For example, the light guiding sections 21, 22, and 23 are formed of polycarbonate. The light shielding section 27 is formed of opaque resin, that is, resin not having optical transparency. Exemplary materials of the light shielding section 27 may include acrylonitrile-butadiene-styrene (ABS) resin.

The light guiding sections 21, 22, and 23 and the light shielding section 27 are integrally molded by two-color molding (double molding). That is, the light guiding sections 21, 22, and 23 and the light shielding section 27 are not sections separately molded and then mounted on each other (combined sections), but are integrally molded with two kinds of materials. The light guiding sections 21, 22, and 23 and the light shielding section 27 are welded (more specifically, thermally welded) to each other at the interfaces therebetween. With this, a reduced number of parts can be achieved and the input device 10 can be manufactured by a process without the process of combining the light guiding sections 21, 22, and 23 and the light shielding section 27.

The light guiding frame 20 has, as the light guiding sections, the first light guiding section 21, the second light guiding section 22, and the third light guiding section 23. The first light guiding section 21 is a section configured to guide light from the first light source S1 to the first light emitting section E1. The second light guiding section 22 is a section configured to guide light from the second light source S2 to the second light emitting sections E2, and the third light guiding section 23 is a section configured to guide light from the third light source S3 to the third light emitting sections E3.

The three light guiding sections 21, 22, and 23 may be coupled to each other through a coupling section 24, 25, or 26 (see FIG. 7A) formed of the same material as those of the light guiding sections. With this, a material can be supplied into a mold by a simplified process in molding the light guiding sections 21, 22, and 23, and a reduced number of parts can be achieved.

The coupling sections 24, 25, and 26 may extend in directions substantially orthogonal to the extending directions of the light guiding sections 21, 22, and 23. For example, the coupling section 24 configured to couple the second light guiding section 22 and the third light guiding section 23 to each other extends in the front-rear direction to be coupled to portions of the light guiding sections 22 and 23 extending in the left-right direction. The coupling section 26 extends in the left-right direction to be coupled to portions of the light guiding sections 21, 22, and 23 extending in the front-rear direction.

[First Light Guiding Section]

As illustrated in FIG. 6, the first light guiding section 21 has a light receiving section 21a configured to receive light from the first light source S1. The light receiving section 21a has a light receiving surface 21b facing the first light source S1. The first light source S1 is disposed to emit light downward. The light receiving surface 21b is located under the first light source S1 and formed to face upward.

Figure 7B:
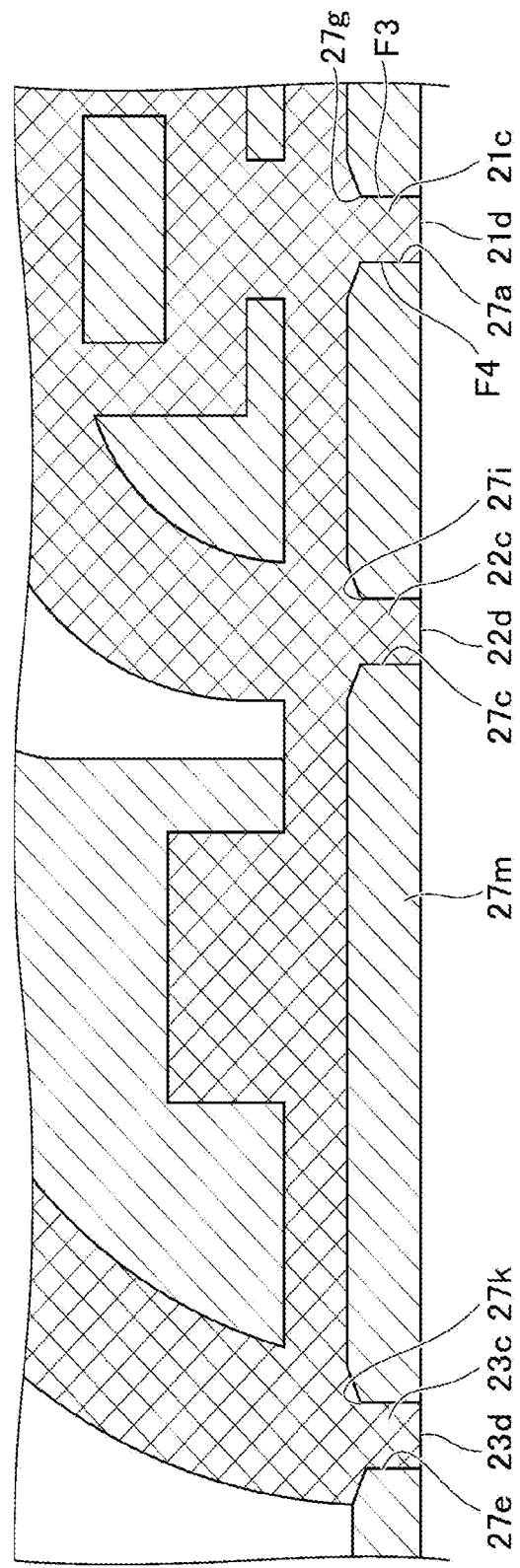
FIG. 7B is an enlarged view of a region VIIb illustrated in FIG. 7A.

As illustrated in FIG. 7B, the first light guiding section 21 has a light output section 21c configured to output light toward the first light emitting section E1 (FIG. 2 and FIG. 3). As described above, the input pad Pd includes the single first light emitting section E1. The light output section 21c has an end surface (light output surface 21d) facing the rear section 51 of the light diffusing member 50. The light output surface 21d faces rearward.

As illustrated in FIG. 6, the first light guiding section 21 has a light transmitting section 21e configured to guide light from the light receiving section 21a to the light output section 21c. The light output section 21c is located on the rear side of the light receiving section 21a. The light transmitting section 21e extends rearward from the light receiving section 21a to reach the light output section 21c. The light receiving section 21a has a reflective surface 21f configured to reflect light from the first light source S1 rearward. The reflective surface 21f is inclined in both the up-down and front-rear directions.

[Second Light Guiding Section]

As illustrated in FIG. 6, the second light guiding section 22 has a light receiving section 22a configured to receive light from the second light source S2. The light receiving section 22a has a light receiving surface 22b facing the second light source S2. The second light source S2 is disposed to emit light downward similarly to the first light source S1. The light receiving surface 22b is located under the second light source S2 and formed to face upward.

As illustrated in FIG. 7A, the second light guiding section 22 has a light output section 22c configured to output light toward the second light emitting section E2 (FIG. 2 and FIG. 3). The input pad Pd includes the two second light emitting sections E2 that are separated away from each other in the left-right direction. Hence, the second light guiding section 22 has the two light output sections 22c that are separated away from each other in the left-right direction. The positions of the two light output sections 22c correspond to the positions of the respective second light emitting sections E2. The light output sections 22c each have an end surface (light output surface 22d of FIG. 7B) facing the rear section 51 of the light diffusing member 50. The light output surface 22d faces rearward.

As illustrated in FIG. 7A, the second light guiding section 22 has a light transmitting section 22e configured to guide light from the light receiving section 22a to the light output section 22c. The second light guiding section 22 has the two light transmitting sections 22e extending from the light receiving section 22a toward the respective two light output sections 22c. One of the light transmitting sections 22e extends leftward from the light receiving section 22a and is curved toward the rear to reach the left-side light output section 22c. The other light transmitting section 22e extends rightward from the light receiving section 22a and is curved toward the rear to reach the right-side light output section 22c.

The second light source S2 is located on the front side of the first light source S1. Hence, as illustrated in FIG. 6, the light receiving section 22a of the second light guiding section 22 is located on the front side of the light receiving section 21a of the first light guiding section 21. The second light guiding section 22 (two light transmitting sections 22e) is formed to surround the first light guiding section 21.

Figure 9:
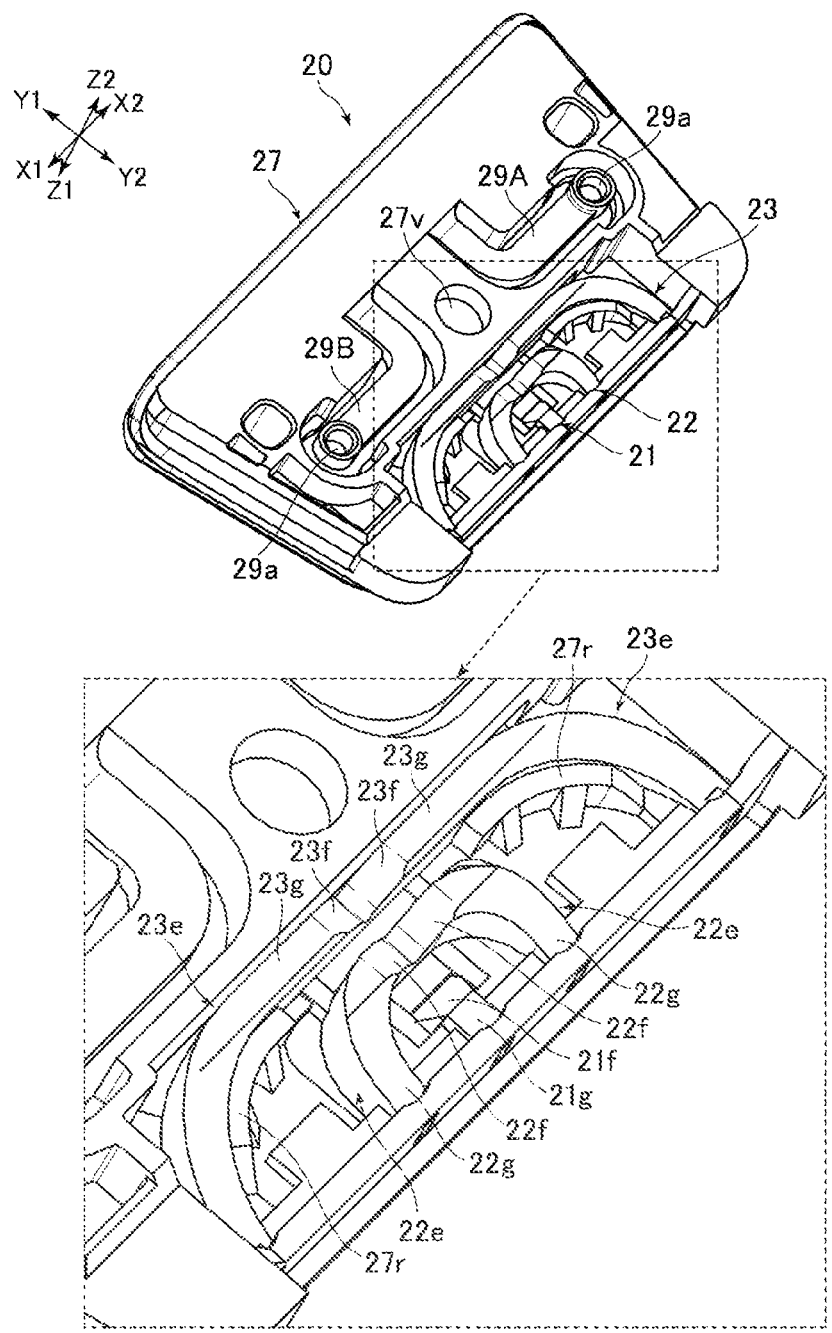
FIG. 9 is a perspective view illustrating the lower side of the light guiding frame.

As illustrated in FIG. 9, the second light guiding section 22 has two reflective surfaces 22f formed under the light receiving surface 22b. The two reflective surfaces 22f reflect light from the second light source S2 toward the left or the right. That is, the reflective surfaces 22f reflect light from the second light source S2 toward the left or right light transmitting section 22e.

[Third Light Guiding Section]

As illustrated in FIG. 6, the third light guiding section 23 has a light receiving section 23a configured to receive light from the third light source S3. The light receiving section 23a has a light receiving surface 23b facing the third light source S3. The third light source S3 is disposed to emit light downward similarly to the light sources S1 and S2. The light receiving surface 23b is located under the third light source S3 and formed to face upward.

As illustrated in FIG. 7A, the third light guiding section 23 has a light output section 23c configured to output light toward the third light emitting section E3 (FIG. 2 and FIG. 3). The input pad Pd includes the two third light emitting sections E3 that are separated away from each other in the left-right direction. Hence, the third light guiding section 23 has the two light output sections 23c that are separated away from each other in the left-right direction. The positions of the two light output sections 23c correspond to the positions of the respective third light emitting sections E3. The light output sections 23c each have an end surface (light output surface 23d; see FIG. 7B) facing the rear section 51 of the light diffusing member 50. The light output surface 23d faces rearward.

As illustrated in FIG. 7A, the third light guiding section 23 has a light transmitting section 23e configured to guide light from the light receiving section 23a to the light output section 23c. The third light guiding section 23 has the two light transmitting sections 23e extending from the light receiving section 23a toward the respective two light output sections 23c. One of the light transmitting sections 23e extends leftward from the light receiving section 23a and is curved toward the rear to reach the left-side light output section 23c. The other light transmitting section 23e extends rightward from the light receiving section 23a and is curved toward the rear to reach the right-side light output section 23c.

The third light source S3 is located on the front side of the light sources S1 and S2. Hence, as illustrated in FIG. 6, the light receiving section 23a of the third light guiding section 23 is located on the front side of the light receiving sections 21a and 22a of the first and second light guiding sections 21 and 22. The third light guiding section 23 (two light transmitting sections 23e) is formed to surround the first and second light guiding sections 21 and 22.

As illustrated in FIG. 9, the third light guiding section 23 has two reflective surfaces 23f formed under the light receiving surface 23b. The two reflective surfaces 23f reflect light from the third light source S3 toward the left or the right. That is, the reflective surfaces 23f reflect light from the third light source S3 toward the left or right light transmitting section 23e.

[Structural Relation Between First Light Guiding Section and Light Shielding Section]

Figure 5:
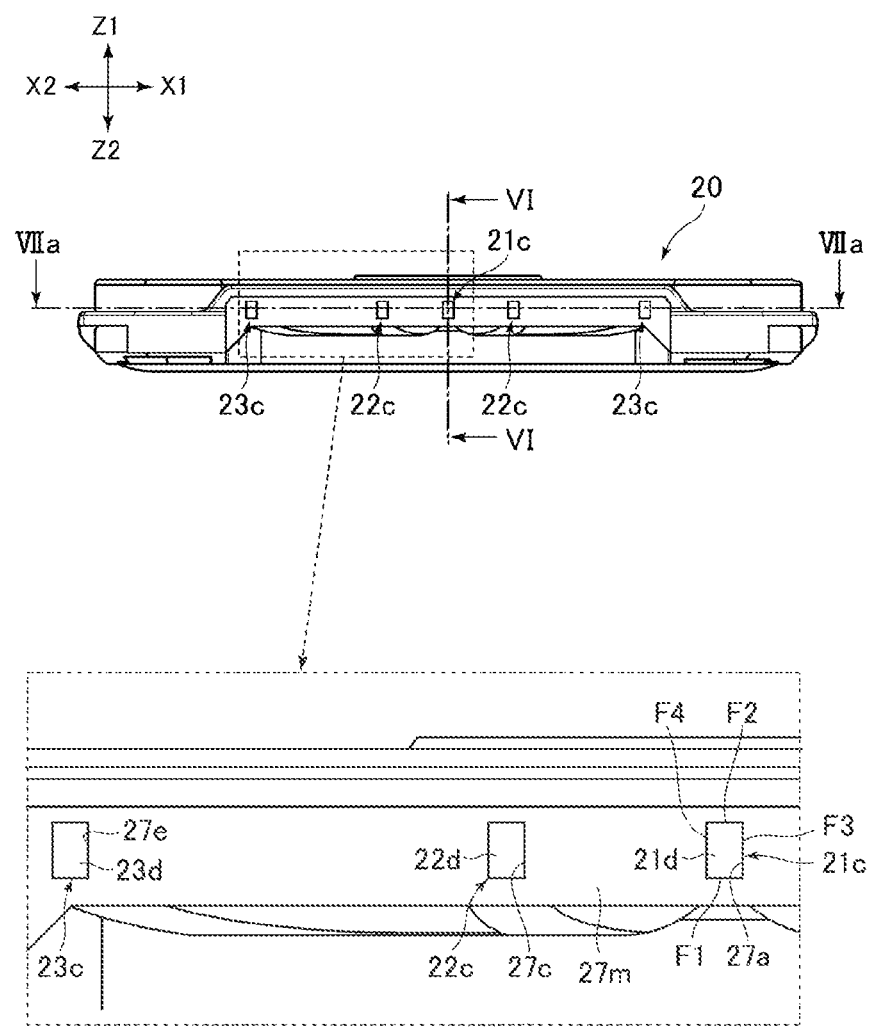
FIG. 5 is a rear view of the light guiding frame.

As illustrated in FIG. 5 and FIG. 7B, the light shielding section 27 has formed therein a first light output opening 27a. The first light output opening 27a is formed in a rear wall 27m located in the rearmost portion of the light shielding section 27, for example. The first light output opening 27a may penetrate the rear wall 27m. The light output section 21c of the first light guiding section 21 is formed inside the first light output opening 27a.

As illustrated in FIG. 5, an inner peripheral edge (inner peripheral surface) 27g of the light output opening 27a is entirely in contact with the light output section 21c. No gap is formed between the outer peripheral surface of the light output section 21c and the inner peripheral edge 27g of the first light output opening 27a. With this, light leakage from an unintended portion can be prevented to allow the first light emitting section E1 to emit light effectively. The inner peripheral edge 27g of the light output opening 27a surrounds the entire periphery of the light output surface 21d.

As described above, the first light guiding section 21 and the light shielding section 27 are integrally molded by two-color molding. Hence, the inner peripheral edge 27g of the first light output opening 27a is fixed to the light output section 21c by welding (more specifically, thermal welding), so that no gap is formed therebetween.

When the first light guiding section 21 and the light shielding section 27 are separately molded, it is difficult to form a constant gap between the first light guiding section 21 and the light shielding section 27 due to the tolerances thereof. Hence, in a case where the plurality of light guiding members 20 are manufactured, some light guiding members 20 may have a portion in which the first light guiding section 21 and the light shielding section 27 are in contact with each other in part. In such a portion, light is absorbed by the light shielding section 27 and hence not reflected well. Accordingly, when the first light guiding section 21 and the light shielding section 27 are separately molded, the luminance of the light emitting section E1 is unstable. In contrast to this, in the input device 10, the first light guiding section 21 and the light shielding section 27 are formed by two-color molding, and hence, no gap is formed between the first light output opening 27a and the light output section 21c, so that the luminance of the light emitting section E1 can be stable. Further, when the first light guiding section 21 and the light shielding section 27 are integrally molded, since a reduced number of parts is used, the elements that play roles in the light emission of the light emitting section E1, such as the light source S1, the first light guiding section 21, the light shielding section 27, and the like have a reduced accumulated tolerance and a reduced shift in relative positions. This also contributes to the stable luminance of the light emitting section E1.

As illustrated in FIG. 7B, the light output section 21c is a protrusion protruding toward the rear and fitted into the first light output opening 27a. The inner peripheral surface of the first light output opening 27a is in close contact with the outer peripheral surface of the light output section 21c. This allows the first light emitting section E1 to emit light more effectively. Further, since the outer peripheral surface of the light output section 21c and the inner peripheral surface of the first light output opening 27a are welded (more specifically, thermally welded) to each other, the light output section 21c can be firmly fixed to the first light output opening 27a. Here, the outer peripheral surface is a surface surrounding the light output surface 21d when the light output surface 21d is seen from a direction orthogonal to the light output surface 21d.

As illustrated in FIG. 5, the light output surface 21d is a rectangle, and the outer peripheral surface of the light output section 21c has four side surfaces F1 to F4. That is, the light output section 21c has the first side surface F1, the second side surface F2 that is a side surface opposite to the first side surface F1, the third side surface F3 facing in a direction orthogonal to the first and second side surfaces F1 and F2, and the fourth side surface F4 that is a side surface opposite to the third side surface F3. The inner peripheral surface of the first light output opening 27a is in close contact with and fixed to each of the four side surfaces F1 to F4.

Note that, the light output surface 21d is not necessarily a rectangle. For example, the light output surface 21d may be a circle. Also in this case, the inner peripheral edge 27g and/or the inner peripheral surface of the first light output opening 27a may entirely be in contact with the light output section 21c.

As still another example, the light output surface 21d may be a polygon such as a triangle, a pentagon, or a hexagon. Also in this case, the inner peripheral edge 27g and/or the inner peripheral surface of the first light output opening 27a may entirely be in contact with the light output section 21c.

Further, the light output section 21c is not necessarily a protrusion. In this case, the light output section 21c may not reach the inner peripheral surface of the first light output opening 27a but be in contact with the inner peripheral edge 27g of the first light output opening 27a.

As illustrated in FIG. 6 and FIG. 8, the light shielding section 27 has formed therein a first light receiving opening 27b. The light receiving section 21a of the first light guiding section 21 is formed inside the first light receiving opening 27b.

The light shielding section 27 is formed on the front side of the rear wall 27m and has a main wall 27n formed to be substantially orthogonal to the up-down direction. The first light receiving opening 27b may be formed in the main wall 27n, for example. The light receiving section 21a may be exposed upward inside the first light receiving opening 27b.

An inner peripheral edge 27h (see FIG. 6) of the first light receiving opening 27b is entirely in contact with the light receiving section 21a. In other words, no gap is formed between the light receiving section 21a and the inner peripheral edge 27h of the first light receiving opening 27b. As a result, leakage of light from the first light source S1 to an unintended region inside the input device 10 can be prevented.

As described above, the first light guiding section 21 and the light shielding section 27 are formed by two-color molding. Hence, no gap is formed between the inner peripheral edge 27h and the light receiving section 21a. Further, the inner peripheral edge 27h is fixed to the light receiving section 21a by welding (more specifically, thermal welding).

As illustrated in FIG. 8, the inner peripheral edge 27h of the first light receiving opening 27b surrounds the entire periphery of the light receiving surface 21b. As a result, light leakage to an unintended region inside the input device 10 can more effectively be prevented.

The light transmitting section 21e of the first light guiding section 21 has an exterior surface extending in the extending direction of the light transmitting section 21e and exposed from the light shielding section 27. As illustrated in FIG. 6 and FIG. 9, the light transmitting section 21e may have a lower surface 21g formed along the extending direction of the light transmitting section 21e (front-rear direction), for example. The lower surface 21g may be exposed from the light shielding section 27. That is, the lower surface 21g is not covered by the light shielding section 27 and may be exposed to air. With this structure, as compared to a structure in which the light shielding section 27 is in contact with the lower surface 21g, light is easily reflected on the lower surface 21g. As a result, light from the first light source S1 can efficiently be guided to the light output section 21c.

The first light guiding section 21 has the reflective surface 21*f* configured to reflect incident light from the light receiving section 21*a* toward the light output section 21*c*. The reflective surface 21*f* is also exposed from the light shielding section 27. The lower surface 21*g* extends rearward from the reflective surface 21*f*.

Note that, the surfaces other than the lower surface 21*g* of the exterior surface of the light transmitting section 21*e* may be exposed. For example, the right and left side surfaces of the light transmitting section 21*e* may be exposed from the light shielding section 27. For example, as illustrated in FIG. 9, the left and right side surfaces of the light transmitting section 21*e* may be exposed from the light shielding section 27 in part.

The exterior surface of the light transmitting section 21*e* may include a surface extending in the extending direction of the light transmitting section 21*e* and fixed to the light shielding section 27. For example, as illustrated in FIG. 6, the light shielding section 27 may be in contact with and fixed to an upper surface 21*i* of the light transmitting section 21*e*. With this, the first light guiding section 21 can have an increased support strength.

[Structural Relation Between Second Light Guiding Section and Light Shielding Section]

As illustrated in FIG. 5 and FIG. 7B, the light shielding section 27 has formed therein a second light output opening 27*c*. The second light output opening 27*c* penetrates the rear wall 27*m*. The light output section 22*c* of the second light guiding section 22 is formed inside the second light output opening 27*c* similarly to the light output section 21*c* of the first light guiding section 21.

An inner peripheral edge 27*i* of the second light output opening 27*c* is in contact with the light output section 22*c*. In other words, no gap is formed between the inner peripheral edge 27*i* and the light output section 22*c*. With this, unintended light leakage can be prevented to allow the second light emitting section E2 to emit light effectively. The inner peripheral edge 27*i* surrounds the entire periphery of the light output surface 22*d* and is entirely in contact with the light output section 22*c*.

As described above, the second light guiding section 22 and the light shielding section 27 are integrally molded by two-color molding. Hence, the inner peripheral edge 27*i* of the second light output opening 27*c* and the light output section 22*c* are in contact with and fixed to each other by welding (more specifically, thermal welding), so that no gap is formed therebetween.

When the second light guiding section 22 and the light shielding section 27 are separately molded, it is difficult to form a constant gap between the second light guiding section 22 and the light shielding section 27 due to the tolerances thereof. Hence, in a case where the plurality of light guiding members 20 are manufactured, some light guiding members 20 may have a portion in which the second light guiding section 22 and the light shielding section 27 are in contact with each other in part. In such a portion, light is absorbed by the light shielding section 27 and hence not reflected well. Accordingly, when the second light guiding section 22 and the light shielding section 27 are separately molded, the luminance of the light emitting section E2 is unstable. In contrast to this, in the input device 10, the second light guiding section 22 and the light shielding section 27 are formed by two-color molding, and hence, no gap is formed between the second light output opening 27*c* and the light output section 22*c*, so that the luminance of the light emitting section E2 can be stable. Further, when the second light guiding section 22 and the light shielding section 27 are integrally molded, since a reduced number of parts is used, the elements that play roles in the light emission of the light emitting section E2, such as the light source S2, the second light guiding section 22, the light shielding section 27, and the like have a reduced accumulated tolerance and a reduced shift in relative positions. This also contributes to the stable luminance of the light emitting section E2.

In the example illustrated in FIG. 7B and the like, the light output section 22*c* is a protrusion protruding toward the rear and fitted into the second light output opening 27*c*. The inner peripheral surface of the second light output opening 27*c* is in close contact with the outer peripheral surface of the light output section 22*c*. This allows the second light emitting section E2 to emit light effectively. Further, since the outer peripheral surface of the light output section 22*c* and the inner peripheral surface of the second light output opening 27*c* are welded (more specifically, thermally welded) to each other, the light output section 22*c* can be firmly fixed to the second light output opening 27*c*. Here, the outer peripheral surface is a surface surrounding the light output surface 22*d* when the light output surface 22*d* is seen from a direction orthogonal to the light output surface 22*d*.

As illustrated in FIG. 5 and FIG. 7B, the light output surface 22*d* is a rectangle. Hence, the outer peripheral surface of the light output section 22*c* of the second light guiding section 22 includes the first side surface F1, the second side surface F2, the third side surface F3, and the fourth side surface F4 similarly to the light output section 21*c* of the first light guiding section 21. The inner peripheral surface of the second light output opening 27*c* is in close contact with each of the four side surfaces F1 to F4.

Note that, the light output surface 22*d* is not necessarily a rectangle. For example, the light output surface 22*d* may be a circle. Also in this case, the inner peripheral edge 27*i* and/or the inner peripheral surface of the second light output opening 27*c* may entirely be in contact with the light output section 22*c*.

As still another example, the light output surface 22*d* may be a polygon such as a triangle, a pentagon, or a hexagon. Also in this case, the inner peripheral edge 27*i* and/or the inner peripheral surface of the second light output opening 27*c* may entirely be in contact with the light output section 22*c*.

Further, the light output section 22*c* is not necessarily a protrusion. In this case, the light output section 22*c* may not reach the inner peripheral surface of the second light output opening 27*c* but be in contact with the inner peripheral edge 27*i* of the second light output opening 27*c*.

As illustrated in FIG. 6 and FIG. 8, the light shielding section 27 has formed therein a second light receiving opening 27*d*. The light receiving section 22*a* of the second light guiding section 22 is formed inside the second light receiving opening 27*d*. The second light receiving opening 27*d* may penetrate the main wall 27*n* in the up-down direction. The light receiving section 22*a* may be exposed upward inside the second light receiving opening 27*d*.

An inner peripheral edge 27*j* of the second light receiving opening 27*d* is entirely in contact with the light receiving section 22*a*. In other words, no gap is formed between the inner peripheral edge 27*j* of the second light receiving opening 27*d* and the light receiving section 22*a*. With this, unintended light leakage can be prevented inside the input device 10.

As described above, the second light guiding section 22 and the light shielding section 27 are integrally molded by two-color molding. Hence, the inner peripheral edge 27*j* and the light receiving section 22*a* are fixed to each other by welding (more specifically, thermal welding), so that no gap is formed therebetween.

As illustrated in FIG. 8, the inner peripheral edge 27*j* of the second light receiving opening 27*d* surrounds the entire periphery of the light receiving surface 22*b* and is entirely in contact with the light receiving section 22*a*. As a result, unintended light leakage can more effectively be prevented.

The light receiving section 22*a* is a protrusion protruding upward toward the second light source S2. The light receiving section 22*a* is fitted into the second light receiving opening 27*d*. Hence, the inner peripheral surface of the second light receiving opening 27*d* is in close contact with the outer peripheral surface of the light receiving section 22*a*. Here, the outer peripheral surface is a surface surrounding the light receiving surface 22*b* when the light receiving surface 22*b* is seen from a direction orthogonal to the light receiving surface 22*b*.

The exterior surface of the light transmitting section 22*e* of the second light guiding section 22 includes a first surface 22*g* (FIG. 9, FIG. 11A, and FIG. 11B), a second surface 22*h* (FIG. 8, FIG. 11A, and FIG. 11B), a third surface 22*i* (FIG. 7A and FIG. 11B), and a fourth surface 22*k* (FIG. 7A and FIG. 11B) that extend in the extending direction of the light transmitting section 22*e*. The four surfaces 22*g*, 22*h*, 22*i*, and 22*k* are surfaces facing in directions different from each other. In the illustrated example, the first surface 22*g* is the lower surface, and the second surface 22*h* is the upper surface. The lower surface 22*g* of the light transmitting section 22*e* may be inclined in such a manner that the light transmitting section 22*e* tapers from the reflective surface 22*f* to the light output section 22*c*. The third surface 22*i* is a surface facing outward in the radial direction of the curved light transmitting section 22*e* (hereinafter referred to as an "outer curved surface"). The fourth surface 22*k* is a surface facing inward in the radial direction of the curved light transmitting section 22*e* (hereinafter referred to as an "inner curved surface").

The light transmitting section 22*e* has an exterior surface exposed from the light shielding section 27. In the illustrated example, the lower surface 22*g* (FIG. 9 and FIG. 11A) and the upper surface 22*h* (FIG. 8 and FIG. 11A) are exposed. That is, the lower surface 22*g* and the upper surface 22*h* are not covered by the light shielding section 27 and are exposed to air. With this structure, as compared to a structure in which the light shielding section 27 is in contact with the lower surface 22*g* and the upper surface 22*h*, light is easily reflected on the surfaces 22*g* and 22*h*, with the result that light from the second light source S2 can efficiently be guided to the light output section 22*c*.

The main wall 27*n* may have formed therein an opening or a hole for exposing the exterior surface of the light transmitting section 22*e*. For example, as illustrated in FIG. 8, the main wall 27*n* may have formed therein an opening 27*q*. The upper surface 22*h* may be exposed upward from the opening 27*q*.

Further, as illustrated in FIG. 7A, the outer curved surface 22*i* may also be exposed from the light shielding section 27. That is, the outer curved surface 22*i* is not covered by the light shielding section 27 and may be exposed to air. With this structure, as compared to a structure in which the light shielding section 27 is in contact with the outer curved surface 22*i*, light is easily reflected on the outer curved surface 22*i*, with the result that light from the second light source S2 can efficiently be guided to the light output section 22*c*.

The outer curved surface 22*i* is a surface facing outward in the radial direction of the curved light transmitting section 22*e* as described above. Hence, with the outer curved surface 22*i* exposed from the light shielding section 27, light can efficiently be reflected on the outer curved surface 22*i*, so that the traveling direction of the light can be bent toward the light output section 22*c*.

Figure 11A:
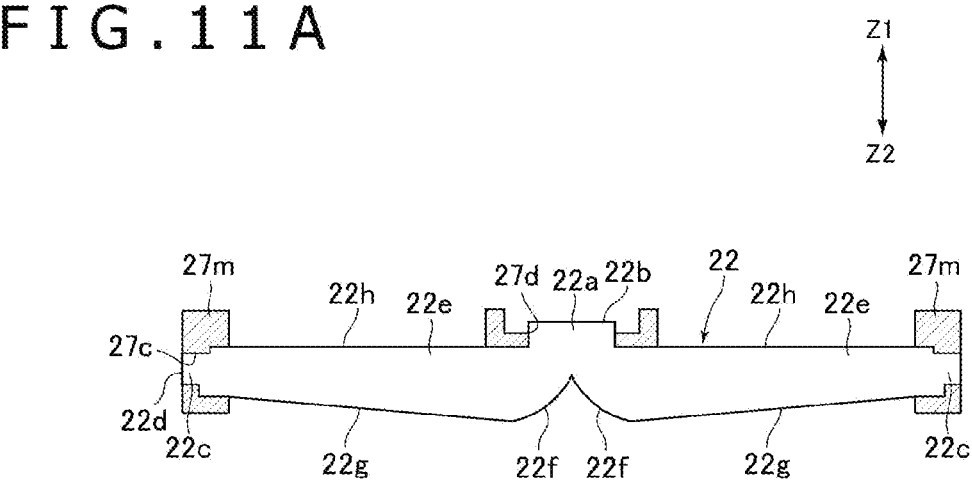
FIG. 11A is a diagram schematically illustrating the cross section of a second light guiding section taken along the cut surface along line XIa-XIa illustrated in FIG. 8.
Figure 11B:
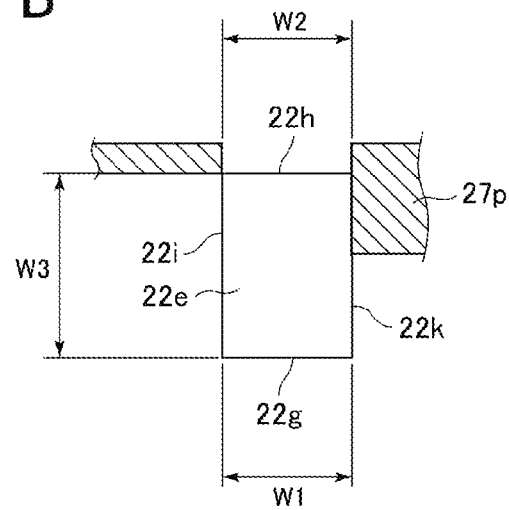
FIG. 11B is a diagram schematically illustrating the cross section of the second light guiding section taken along the cut surface along line XIb-XIb illustrated in FIG. 8.

As illustrated in FIG. 11B, when the cross section of the light transmitting section 22*e* on a plane orthogonal to the extending direction of the light transmitting section 22*e* (the cross section of FIG. 11B) is seen, half or more of the exterior surface of the light transmitting section 22*e* may be exposed from the light shielding section 27. That is, "W1+W2+W3>L/2" may hold where W1, W2, and W3 (see FIG. 11B) denote the width of the lower surface 22*g*, the width of the upper surface 22*h*, and the width of the outer curved surface 22*i* that appear on the cross section of the light transmitting section 22*e*, respectively, and L denotes the length of the entire outer periphery of the cross section of the light transmitting section 22*e*. With this, a sufficient area of the exterior surface of the light transmitting section 22*e* is exposed from the light shielding section 27. As a result, light from the second light source S2 can efficiently be guided to the light output section 22*c*. Note that, (W1+W2+W3) may be larger than $2/3$ of the length L of the entire outer periphery of the cross section ("W1+W2+W3>L×$2/3$").

As illustrated in FIG. 11A, the lengths in the extending direction of the light transmitting section 22*e* of the lower surface 22*g* and the upper surface 22*h* (the lengths of the exposed surfaces) may be larger than half the distance from the light receiving surface 22*b* to the light output surface 22*d*. With this, the exterior surface of the light transmitting section 22*e* is largely exposed from the light shielding section 27, with the result that light from the second light source S2 can efficiently be guided to the light output section 22*c*. The lengths in the extending direction of the light transmitting section 22*e* of the lower surface 22*g* and the upper surface 22*h* may be larger than $2/3$ of the distance from the light receiving surface 22*b* to the light output surface 22*d*.

The light transmitting section 22*e* may have a surface extending in the extending direction of the light transmitting section 22*e* and fixed to the light shielding section 27. For example, as illustrated in FIG. 7B and FIG. 11B, the light shielding section 27 may have a support section 27*p* formed along the inner curved surface 22*k*, and the support section 27*p* may be fixed to the inner curved surface 22*k*. As described above, the second light guiding section 22 and the light shielding section 27 are integrally molded by two-color molding. Hence, the inner curved surface 22*k* of the light transmitting section 22*e* and the support section 27*p* are fixed to each other by welding (more specifically, thermal welding). With this, the light guiding frame 20 can have an increased strength.

As illustrated in FIG. 11B, the inner curved surface 22*k* may also be exposed from the support section 27*p* in part. In the example illustrated in FIG. 11B, the lower portion of the inner curved surface 22*k* is exposed from the support section 27*p*.

Further, the three exposed surfaces 22*g*, 22*h*, and 22*i* of the light transmitting section 22*e* may also be fixed to the light shielding section 27 in part. For example, an uppermost portion 22*j* of the outer curved surface 22*i* may be fixed to the light shielding section 27, and the remaining of the outer curved surface 22*i* may be exposed from the light shielding section 27. With this, the second light guiding section 22 and the light guiding frame 20 can have increased strengths.

Note that, the shape of the light transmitting section 22e is not limited to the illustrated example. For example, the light transmitting section 22e may be a cylinder. In this case, when the cross section of the light transmitting section 22e on the plane orthogonal to the extending direction of the light transmitting section 22e is seen, a portion of the outer peripheral edge of the cross section corresponding to half or more of the length L of the entire outer peripheral edge in question may be exposed. Further, the remaining may be in contact with (welded to) the light shielding section 27.

Further, the light transmitting section 22e is not necessarily curved. For example, the light transmitting section 22e may extend linearly from the light receiving section 22a to the light output section 22c. Further, the second light guiding section 22 may have the single light output section 22c and the single light transmitting section 22e.

[Structural Relation Between Third Light Guiding Section and Light Shielding Section]

As illustrated in FIG. 5 and FIG. 7B, the light shielding section 27 has formed therein a third light output opening 27e. The third light output opening 27e penetrates the rear wall 27m. The light output section 23c of the third light guiding section 23 is formed inside the third light output opening 27e.

As illustrated in FIG. 7B, an inner peripheral edge 27k of the third light output opening 27e is entirely in contact with the light output section 23c. In other words, no gap is formed between the inner peripheral edge 27k and the light output section 23c. With this, light leakage from an unintended portion can be prevented to allow the third light emitting section E3 to emit light effectively. The inner peripheral edge 27k surrounds the entire periphery of the light output surface 23d.

The third light guiding section 23 and the light shielding section 27 are integrally molded by two-color molding. Hence, the inner peripheral edge 27k of the third light output opening 27e and the light output section 23c are fixed to each other by welding (more specifically, thermal welding), so that no gap is formed therebetween.

When the third light guiding section 23 and the light shielding section 27 are separately molded, it is difficult to form a constant gap between the third light guiding section 23 and the light shielding section 27 due to the tolerances thereof. Hence, in a case where the plurality of light guiding members 20 are manufactured, some light guiding members 20 may have a portion in which the third light guiding section 23 and the light shielding section 27 are in contact with each other in part. In such a portion, light is absorbed by the light shielding section 27 and hence not reflected well. Accordingly, when the third light guiding section 23 and the light shielding section 27 are separately molded, the luminance of the light emitting section E3 is unstable. In contrast to this, in the input device 10, the third light guiding section 23 and the light shielding section 27 are formed by two-color molding, and hence, no gap is formed between the third light output opening 27e and the light output section 23c, so that the luminance of the light emitting section E3 can be stable. Further, when the third light guiding section 23 and the light shielding section 27 are integrally molded, since a reduced number of parts is used, the elements that play roles in the light emission of the light emitting section E3, such as the light source S3, the third light guiding section 23, the light shielding section 27, and the like have a reduced accumulated tolerance and a reduced shift in relative positions. This also contributes to the stable luminance of the light emitting section E3.

As illustrated in FIG. 7B, the light output section 23c is a protrusion protruding toward the rear and fitted into the third light output opening 27e. The inner peripheral surface of the third light output opening 27e is in close contact with the outer peripheral surface of the light output section 23c. This allows the third light emitting section E3 to emit light effectively. Further, since the outer peripheral surface of the light output section 23c and the inner peripheral surface of the third light output opening 27e are welded (more specifically, thermally welded) to each other, the light output section 23c can firmly be fixed to the third light output opening 27e. Here, the outer peripheral surface is a surface surrounding the light output surface 23d when the light output surface 23d is seen from a direction orthogonal to the light output surface 23d.

As illustrated in FIG. 5 and FIG. 7B, the light output surface 23d is a rectangle. Accordingly, the outer peripheral surface of the light output section 23c of the third light guiding section 23 has the four side surfaces F1 to F4 similarly to the light output section 21c of the first light guiding section 21. The inner peripheral surface of the third light output opening 27e is in close contact with each of the four side surfaces F1 to F4.

Note that, the light output surface 23d is not necessarily a rectangle. For example, the light output surface 23d may be a circle. Also in this case, the inner peripheral edge 27k and/or the inner peripheral surface of the third light output opening 27e may entirely be in contact with the light output section 23c.

As still another example, the light output surface 23d may be a polygon such as a triangle, a pentagon, or a hexagon. Also in this case, the inner peripheral edge 27k and/or inner peripheral surface of the third light output opening 27e may entirely be in contact with the light output section 23c.

Further, the light output section 23c is not necessarily a protrusion. In this case, the light output section 23c may not reach the inner peripheral surface of the third light output opening 27e but be in contact with the inner peripheral edge 27k of the third light output opening 27e.

As illustrated in FIG. 6, the light shielding section 27 has formed therein a third light receiving opening 27f. The light receiving section 23a of the third light guiding section 23 is formed inside the third light receiving opening 27f. The light receiving section 23a may be exposed upward inside the third light receiving opening 27f.

An edge 27L of the third light receiving opening 27f is in contact with the light receiving section 23a. In other words, no gap is formed between the edge 27L of the third light receiving opening 27f and the light receiving section 23a. With this, unintended light leakage inside the input device 10 can be prevented.

As described above, the third light guiding section 23 and the light shielding section 27 are formed by two-color molding. Hence, no gap is formed between the edge 27L and the light receiving section 23a. Further, the edge 27L and the light receiving section 23a are fixed to each other by welding (more specifically, thermal welding).

As illustrated in FIG. 8, the edge 27L of the third light receiving opening 27f is in contact with only part of the outer edge of the light receiving section 23a unlike the inner peripheral edge 27h of the first light receiving opening 27b and the inner peripheral edge 27j of the second light receiving opening 27d, which are described above. Specifically, the edge 27L is in contact with only the rear edge of the light receiving section 23a. Unlike the example illustrated in FIG. 8, the edge 27L of the third light receiving opening 27f may surround the entire light receiving section 23a similarly to the second light receiving opening 27d.

The exterior surface of the light transmitting section 23e of the third light guiding section 23 includes a first surface 23g (FIG. 9, FIG. 12A, and FIG. 12B), a second surface 23h (FIG. 8, FIG. 12A, and FIG. 12B), a third surface 23i (FIG. 7A, FIG. 12A, and FIG. 12B), and a fourth surface 23k (FIG. 7A, FIG. 12A, and FIG. 12B) that extend in the extending direction of the light transmitting section 23e. The four surfaces 23g, 23h, 23i, and 23k are surfaces facing in directions different from each other. In the illustrated example, the first surface 23g is the lower surface, and the second surface 23h is the upper surface. As illustrated in FIG. 9, the lower surface 23g of the light transmitting section 23e may be inclined in such a manner that the light transmitting section 23e tapers from the reflective surface 23f to the light output section 23c. The third surface 23i is a surface facing outward in the radial direction of the curved light transmitting section 23e (hereinafter referred to as an "outer curved surface"). The fourth surface 23k is a surface facing inward in the radial direction of the curved light transmitting section 23e (hereinafter referred to as an "inner curved surface").

The light transmitting section 23e has an exterior surface exposed from the light shielding section 27. In the illustrated example, the lower surface 23g and the upper surface 23h are exposed. That is, the lower surface 23g and the upper surface 23h are not covered by the light shielding section 27 and are exposed to air. With this structure, as compared to a structure in which the light shielding section 27 is in contact with the surfaces 23g and 23h, light is easily reflected on the lower surface 23g and the upper surface 23h, with the result that light from the third light source S3 can efficiently be guided to the light output section 23c.

The main wall 27n may have formed therein an opening or a hole for exposing the exterior surface of the light transmitting section 23e. For example, as illustrated in FIG. 8, the main wall 27n may have formed therein an opening 27s. The upper surface 23h may be exposed upward from the opening 27s.

Figure 12A:
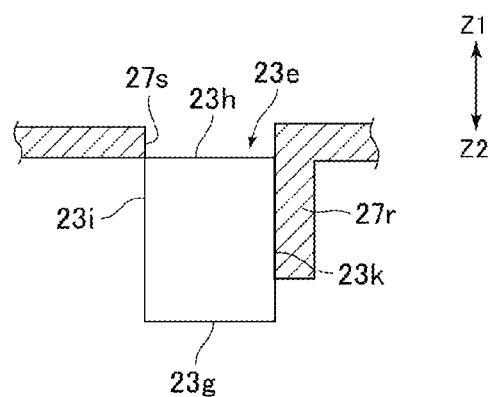
FIG. 12A is a diagram schematically illustrating the cross section of a third light guiding section taken along the cut surface along line XIIa-XIIa illustrated in FIG. 8.
Figure 12B:
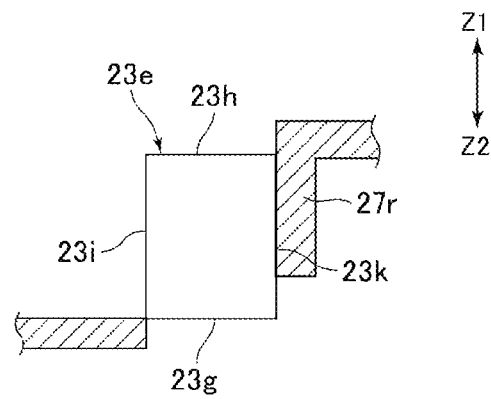
FIG. 12B is a diagram schematically illustrating the cross section of the third light guiding section taken along the cut surface along line XIIb-XIIb illustrated in FIG. 8.

Further, as illustrated in FIG. 7A, FIG. 12A, and FIG. 12B, the outer curved surface 23i may also be exposed from the light shielding section 27. That is, the outer curved surface 23i is not covered by the light shielding section 27 and may be exposed to air. With this structure, as compared to a structure in which the light shielding section 27 is in contact with the outer curved surface 23i, light is easily reflected on the outer curved surface 23i, with the result that light from the third light source S3 can efficiently be guided to the light output section 23c.

The outer curved surface 23i is a surface facing outward in the radial direction of the curved light transmitting section 23e as described above. Hence, with the outer curved surface 23i exposed from the light shielding section 27, light can efficiently be reflected on the outer curved surface 23i, so that the traveling direction of the light can be bent toward the light output section 23c.

Note that, the following holds true for the light transmitting section 23e of the third light guiding section 23 as with the light transmitting section 22e of the second light guiding section 22 described with reference to FIG. 11B: when the cross section of the light transmitting section 23e on a plane orthogonal to the extending direction of the light transmitting section 23e is seen, half or more of the exterior surface of the light transmitting section 23e may be exposed. With this, light is easily reflected on the exterior surface of the light transmitting section 23e, with the result that light from the third light source S3 can efficiently be guided to the light output section 23c.

Further, similarly to the light transmitting section 22e of the second light guiding section 22, the lengths in the extending direction of the light transmitting section 23e of the third light guiding section 23 of the lower surface 23g and the upper surface 23h may be larger than half the distance from the light receiving surface 23b to the light output surface 23d. With this, the exterior surface of the light transmitting section 23e is largely exposed from the light shielding section 27, with the result that light from the third light source S3 can efficiently be guided to the light output section 23c. The lengths in the extending direction of the light transmitting section 23e of the lower surface 23g and the upper surface 23h may be larger than 2/3 of the distance from the light receiving surface 23b to the light output surface 23d.

The light transmitting section 23e may have a surface extending in the extending direction of the light transmitting section 23e and fixed to the light shielding section 27. For example, as illustrated in FIG. 9, FIG. 12A, and FIG. 12B, the light shielding section 27 may have a support wall 27r formed along the inner curved surface 23k. Further, the support wall 27r may be in contact with the inner curved surface 23k. As described above, the third light guiding section 23 and the light shielding section 27 are integrally molded by two-color molding. Hence, the inner curved surface 23k of the light transmitting section 23e and the support wall 27r are fixed to each other by welding (more specifically, thermal welding). With this, the light guiding frame 20 can have an increased strength.

Note that, the shape of the light transmitting section 23e is not limited to the illustrated example. For example, the light transmitting section 23e may be a cylinder. Also in this case, when the cross section of the light transmitting section 23e on the plane orthogonal to the extending direction of the light transmitting section 23e is seen, half or more of the exterior surface of the light transmitting section 23e may be exposed from the light shielding section 27. Further, the remaining may be in contact with (welded to) the light shielding section 27.

Further, the light transmitting section 23e is not necessarily curved. For example, the light transmitting section 23e may extend linearly from the light receiving section 23a to the light output section 23c. Further, the third light guiding section 23 may have the single light output section 23c and the single light transmitting section 23e.

[Light Shielding Wall]

As illustrated in FIG. 6, the light shielding section 27 has light shielding walls 27t and 27u. The light shielding wall 27t is formed between the adjacent two light receiving openings 27b and 27d and protrudes over the end surfaces of the light receiving sections 21a and 22a (that is, the light receiving surfaces 21b and 22b). The light shielding wall 27t can prevent light from the first light source Si from entering the light receiving section 22a of the second light guiding section 22 and light from the second light source S2 from entering the light receiving section 21a of the first light guiding section 21.

As illustrated in FIG. 6, the distance from the level of the light receiving surfaces 21b and 22b to the upper end surface of the light shielding wall 27t (the height of the light shielding wall 27t) is larger than the distance from the level of the light receiving surfaces 21b and 22b to the level of the lower ends of the light sources 51 and S2. This makes it possible to more effectively prevent light from the first light source 51 from entering the light receiving section 22*a* of the second light guiding section 22 and light from the second light source S2 from entering the light receiving section 21*a* of the first light guiding section 21.

Further, the light shielding wall 27*u* is formed between the adjacent two light receiving openings 27*d* and 27*f* and protrudes over the end surfaces of the light receiving sections 22*a* and 23*a* (that is, the light receiving surfaces 22*b* and 23*b*). The light shielding wall 27*u* can prevent light from the second light source S2 from entering the light receiving section 23*a* of the third light guiding section 23 and light from the third light source S3 from entering the light receiving section 22*a* of the second light guiding section 22.

As illustrated in FIG. 6, the distance from the level of the light receiving surfaces 22*b* and 23*b* to the upper end surface of the light shielding wall 27*u* (the height of the light shielding wall 27*u*) is larger than the distance from the level of the light receiving surfaces 22*b* and 23*b* to the level of the lower ends of the light sources S2 and S3. This makes it possible to more effectively prevent light from the second light source S2 from entering the light receiving section 23*a* of the third light guiding section 23 and light from the third light source S3 from entering the light receiving section 22*a* of the second light guiding section 22.

[Rear Wall of Light Shielding Section]

As described above, the light shielding section 27 has the rear wall 27*m*. As illustrated in FIG. 6, the exterior plate 30 has a groove 30*a* extending along the rear edge thereof. The rear wall 27*m* has a top section 28*a* fitted into the groove 30*a*. This makes it possible to prevent light from the light sources S1, S2, and S3 from leaking from a portion between the rear edge of the exterior plate 30 and the rear wall 27*m*.

Further, as illustrated in FIG. 6, the exterior plate 30 has a protrusion 30*b* extending along the rear edge thereof. The protrusion 30*b* is disposed on a step formed on the rear side of the top section 28*a*. This makes it possible to further effectively prevent light from the light sources S1, S2, and S3 from leaking between the rear edge of the exterior plate 30 and the rear wall 27*m*.

As illustrated in FIG. 6, the groove 30*a*, the protrusion 30*b*, and the top section 28*a* are formed not only above the light output section 21*c* of the first light guiding section 21, but also above the light output section 22*c* of the second light guiding section 22 and the light output section 23*c* of the third light guiding section 23.

In contrast to the example illustrated in FIG. 6, a groove extending along the rear edge of the exterior plate 30 may be formed in the upper end of the rear wall 27*m* of the light guiding frame 20, and a protrusion to be fitted into the groove may be formed on the rear edge of the exterior plate 30. Also in this case, light from the light sources S1, S2, and S3 can effectively be prevented from leaking from a portion between the rear edge of the exterior plate 30 and the rear wall 27*m*.

As illustrated in FIG. 6, the upper end surface of the top section 28*a* of the rear wall 27*m* is located higher than the light sources S1, S2, and S3. This makes it possible to more effectively prevent light from the light sources S1, S2, and S3 from leaking from a portion between the rear edge of the exterior plate 30 and the rear wall 27*m*. The upper end surface of the top section 28*a* is located higher than the circuit board 40 having implemented thereon the light sources S1, S2, and S3. This makes it possible to more effectively prevent light from the light sources S1, S2, and S3 from leaking from a portion between the rear edge of the exterior plate 30 and the rear wall 27*m*.

[Plate Spring Section]

Figure 10:
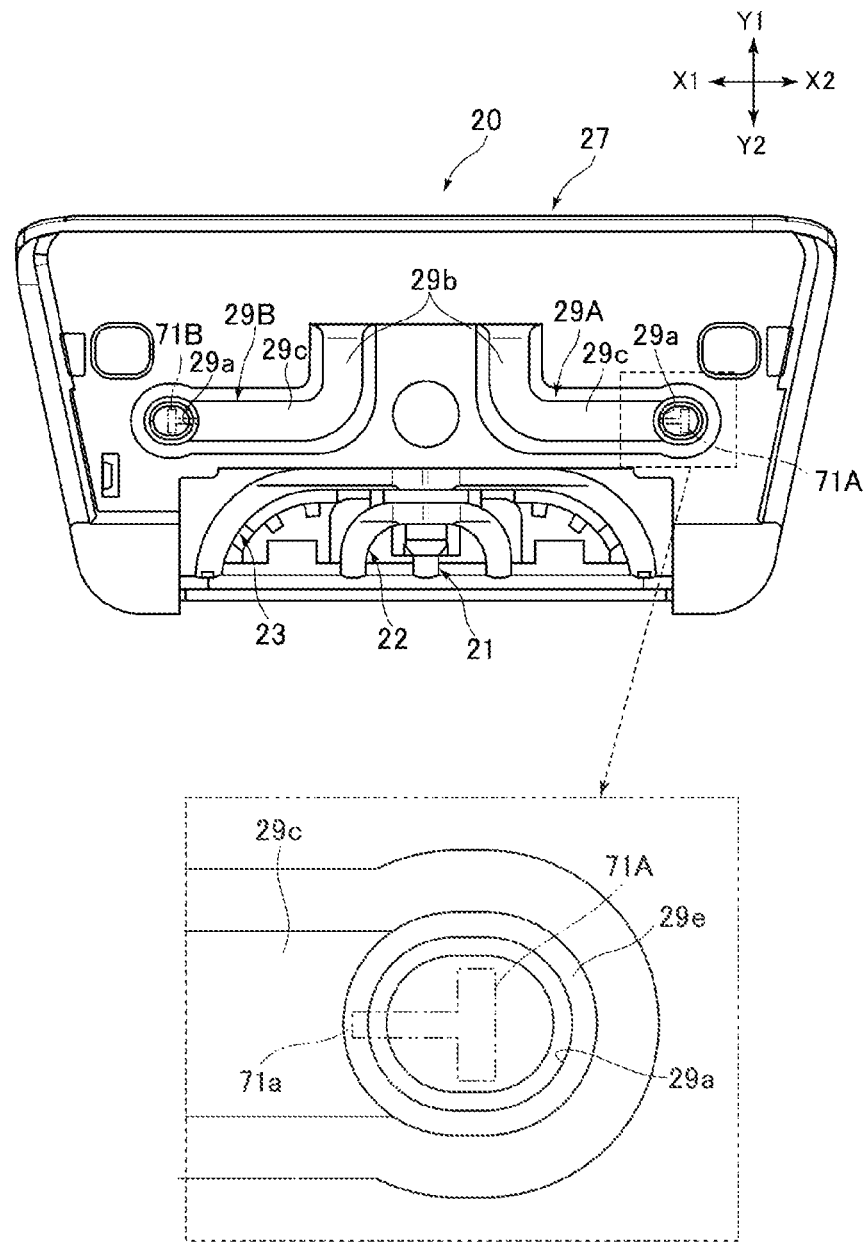
FIG. 10 is a bottom view of the light guiding frame.

The input pad Pd is supported to be vertically movable. The input device 10 has two support protrusions 71A and 71B (see FIG. 10) formed under the input pad Pd. The two support protrusions 71A and 71B are disposed away from each other in the left-right direction. Meanwhile, the light guiding frame 20 of the input pad Pd has plate spring sections 29A and 29B as illustrated in FIG. 9 and FIG. 10. Holes 29*a* to be supported are formed in the end portions of the plate spring sections 29A and 29B. The support protrusions 71A and 71B are fitted into the holes 29*a* to be supported. The input pad Pd is biased upward by the elasticity of the plate spring sections 29A and 29B. With this, the input pad Pd may function as a button to be pressed. That is, when the user stops pressing the input pad Pd, the input pad Pd returns to the initial position by the elasticity of the plate spring sections 29A and 29B.

The plate spring sections 29A and 29B may be formed of a material different from that of the light shielding section 27. The plate spring sections 29A and 29B are preferably formed of a material suitable for elastic deformation. Exemplary materials of the plate spring sections 29A and 29B may include polycarbonate. For example, the plate spring sections 29A and 29B may be integrally molded with the light shielding section 27 by two-color molding with the same material as the light guiding sections 21, 22, and 23. With this, the plate spring sections 29A and 29B can easily be molded.

As illustrated in FIG. 10, the plate spring sections 29A and 29B may be formed into a substantially L shape. That is, the plate spring sections 29A and 29B may each have a first extending section 29*b* extending from the base of the plate spring section 29A or 29B and a second extending section 29*c* extending from the end portion of the first extending section 29*b* in a direction intersecting with the first extending section 29*b*. In the example illustrated in FIG. 10, the first extending section 29*b* extends rearward from the base. The second extending section 29*c* extends from the first extending section 29*b* toward the outside in the left-right direction.

With the plate spring sections 29A and 29B having the substantially L shape as described above, the plate spring sections 29A and 29B can have an appropriate length. As a result, the elasticity of the plate spring sections 29A and 29B is easily adjusted. For example, when the length of the plate spring sections 29A and 29B is increased, the elasticity can be reduced without a reduction in thickness of the plate spring sections 29A and 29B. It is sometimes difficult to mold the thin plate spring sections 29A and 29B with resin. Therefore, the structure that allows a reduction in elasticity depending on the length of the plate spring sections 29A and 29B is effective.

As illustrated in FIG. 10, a slope 29*e* is formed on the inner peripheral edge of the lower end of the hole 29*a* to be supported. The upper end portion of the support protrusion 71A or 71B abuts against the slope 29*e*. The support protrusions 71A and 71B may have a substantially T shape. Further, an end portion 71*a* of the T shape abuts against a portion of the inner peripheral edge of the hole 29*a* to be supported. Specifically, the end portion 71*a* abuts against an outer portion in the left-right direction of the inner peripheral edge of the hole 29*a* to be supported. Since the abutment positions between the support protrusions 71A and 71B and the plate spring sections 29A and 29B are fixed (unchanged) in this way, the elasticity of the plate spring sections 29A and 29B can be stable.

As illustrated in FIG. 6, a switch 42 may be implemented on the lower surface of the circuit board 40. The input device 10 includes a stopper at a position corresponding to the switch 42. When the input pad Pd is pressed down, the switch 42 reaches the stopper to turn on. With this, the user's pressing operation on the input pad Pd is detected. The light guiding frame 20 (light shielding section 27) has formed therein an opening 27v for exposing the switch 42 downward.

Modified Examples

Note that, the shape of the light guiding frame 20 is not limited to the example described above.

For example, the input device 10 includes the plurality of light sources S1, S2, and S3. However, the number of light sources may be one or two. Moreover, the number of light sources may be four or more. In this case, the light guiding frame 20 may have as many light guiding sections as light sources.

Further, the light guiding sections 22 and 23 extend leftward and rightward from the light receiving sections 22a and 23a, respectively. However, the structures of the light guiding sections 22 and 23 proposed in an embodiment of the present disclosure may be applied to one of light guiding sections extending rightward or leftward from the light receiving section 22a or 23a. Further, the structures of the light guiding sections 22 and 23 proposed in an embodiment of the present disclosure may be applied to light guiding sections extending in only one direction from the light receiving sections.

[System Including Input Device]

Figure 13:
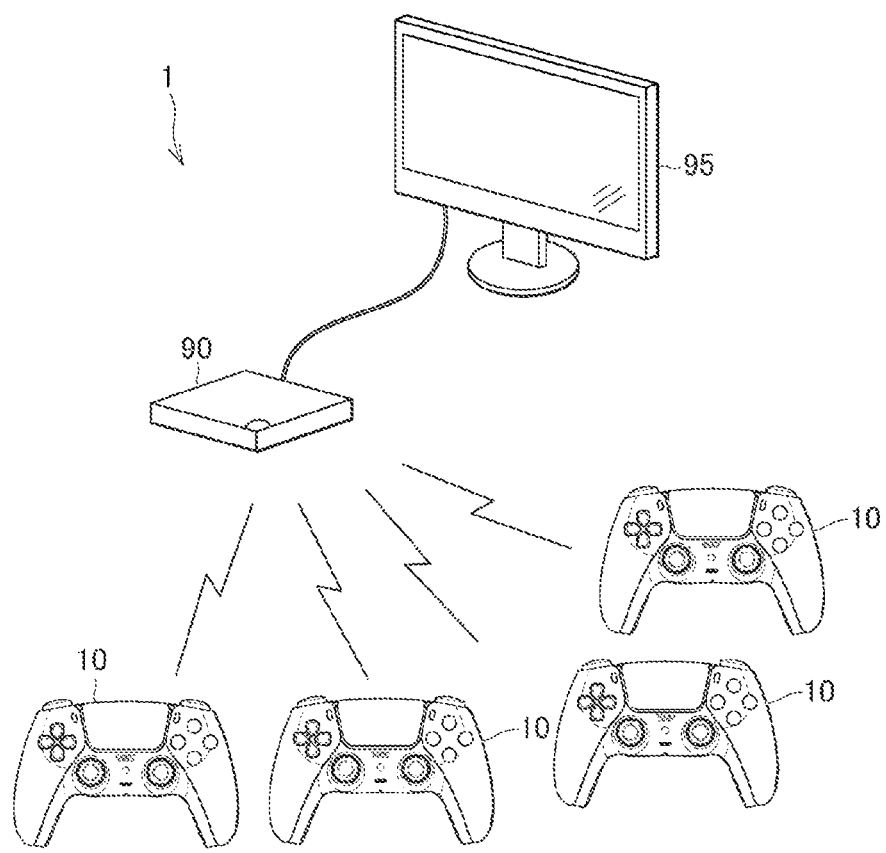
FIG. 13 is a diagram illustrating a system in which the input device is used.

FIG. 13 is a diagram illustrating an exemplary configuration of a system 1 including the input device 10. As illustrated in FIG. 13, the system 1 includes an information processing apparatus 90, a display apparatus 95, and the plurality of input devices 10.

The information processing apparatus 90 is a video game console or a personal computer (PC), for example. The display apparatus 95 is a liquid crystal display or an organic electroluminescence (EL) display, for example, and displays video and the like based on a video signal output from the information processing apparatus 90. Note that the information processing apparatus 90 and the display apparatus 95 may be implemented as an apparatus integrated with a display, such as a smartphone or a tablet PC. The information processing apparatus 90 may be connected to a server apparatus via a network such as the Internet and receive data from the server apparatus. Further, the information processing apparatus 90 may output the result of processing (video game processing or the like) executed by the server apparatus to the display apparatus 95. Further, the information processing apparatus 90 may be a server apparatus that is connected via a network.

Figure 14A:
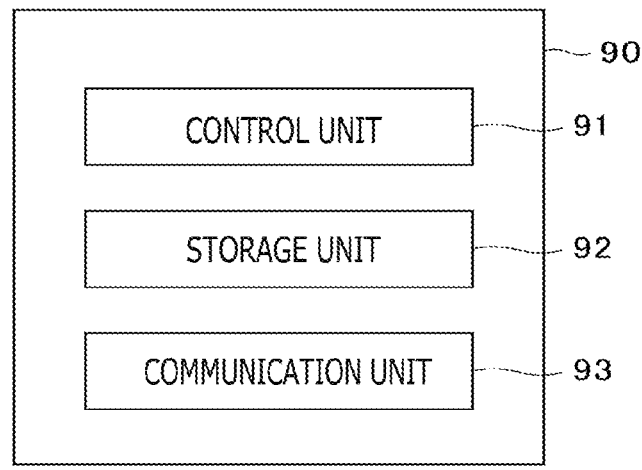
FIG. 14A is a block diagram illustrating the configuration of an information processing apparatus.

FIG. 14A is a diagram illustrating an exemplary configuration of the information processing apparatus 90. As illustrated in FIG. 14A, the information processing apparatus 90 includes a control unit 91, a storage unit 92, a communication unit 93, and the like. The control unit 91 includes, for example, a central processing unit (CPU) or a graphics processing unit (GPU), and the storage unit 92 is a storage element such as a read-only memory (ROM) or a random-access memory (RAM), a hard disk drive (HDD), a solid-state drive (SSD), or the like. The CPU operates in accordance with a program installed on the storage unit 92 and executes a video game program stored in the storage unit 92 or another storage unit, for example, to generate video and audio. The communication unit 93 is a communication interface such as a network board, a wireless local area network (LAN) module, or a Bluetooth (registered trademark) module and establishes wired or wireless data communication with each of the plurality of input devices 10.

Figure 14B:
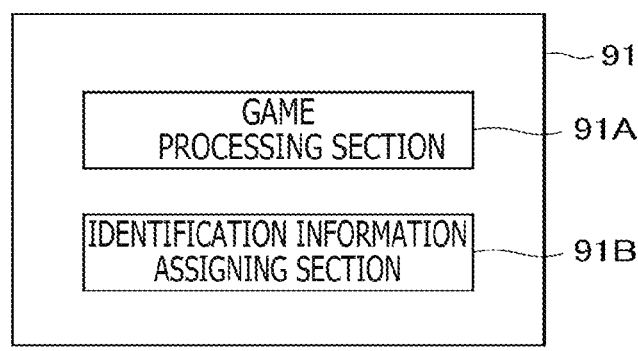
FIG. 14B is a block diagram illustrating the functions of a control unit included in the information processing apparatus.

FIG. 14B is a block diagram illustrating exemplary functions that the control unit 91 implements. As illustrated in FIG. 14B, the control unit 91 includes, as its functions, for example, a video game processing section 91A and an identification information assigning section 91B. The video game processing section 91A executes a video game program stored in the storage unit 92 or another storage unit to generate video and audio as the execution result. The video game processing section 91A may be implemented by a control unit, such as a CPU, included in a server apparatus.

The identification information assigning section 91B assigns identification information unique to the input device 10 connected to the information processing apparatus 90. The identification information assigning section 91B assigns such numbers as "1," "2," and "3" to the respective input devices 10 as identification information. For example, in a case where the three input devices 10 are connected to the information processing apparatus 90, the identification information assigning section 91B assigns "1" to the first input device 10, assigns "2" to the second input device 10, and assigns "3" to the third input device 10. In a case where four or five input devices 10 are used, the identification information assigning section 91B may assign "4" to the fourth input device 10 and assign "5" to the fifth input device 10. The assigned numbers are transmitted to the respective input devices 10.

Figure 15A:
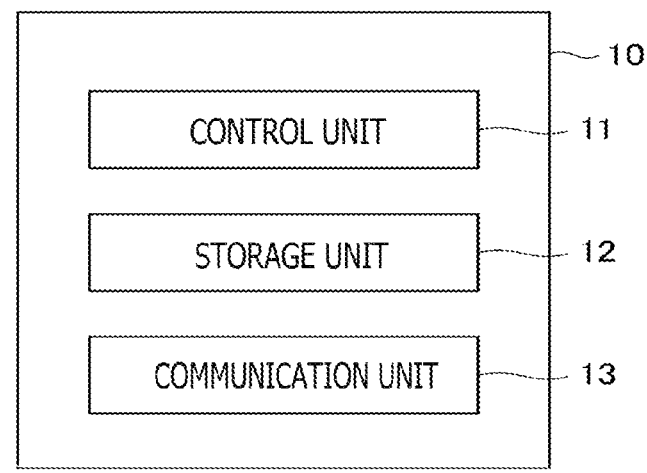
FIG. 15A is a block diagram illustrating the configuration of the input device.

FIG. 15A is a block diagram illustrating an exemplary configuration of the input device 10. The input device 10 includes the control unit 11, a storage unit 12, a communication unit 13, and the like. The control unit 11 is a drive circuit such as a digital signal processor (DSP). The storage unit 12 is a storage element such as a memory. The communication unit 13 is a communication interface such as a wireless LAN module or a Bluetooth module and establishes wired or wireless data communication with the communication unit 93 of the information processing apparatus 90.

Figure 15B:
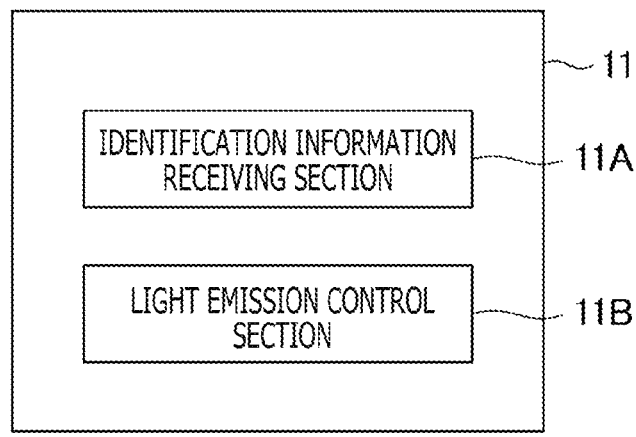
FIG. 15B is a block diagram illustrating the functions of a control unit included in the input device.

FIG. 15B is a block diagram illustrating exemplary functions that the input device 10 implements. As illustrated in FIG. 15B, the input device 10 includes, as its functions, for example, an identification information receiving section 11A and a light emission control section 11B. The identification information receiving section 11A receives identification information, such as a number, transmitted from the information processing apparatus 90 via the communication unit 13. The light emission control section 11B controls the light sources S1 to S3 (see FIG. 6) in reference to identification information (for example, "1" or "2") received by the identification information receiving section 11A.

For example, the light emission control section 11B may turn on only the light source S1 in a case where "1" is assigned to the input device 10 as identification information, and may turn on only the light source S2 in a case where "2" is assigned to the input device 10 as identification information. Further, the light emission control section 11B may turn on the first light source S1 and the third light source S3 in a case where "3" is assigned to the input device 10 as identification information, and may turn on the second light source S2 and the third light source S3 in a case where "4" is assigned to the input device 10 as identification information. Further, in a case where "5" is assigned as identification information, the three light sources S1, S2, and S3 may be turned on. With this, of the light emitting sections E1, E2, and E3, as many light emitting sections as indicated by an assigned number are turned on.

Conclusion

As described above, in the input device 10, the light guiding sections 21, 22, and 23 have the light receiving section 21a, 22a, or 23a, the light output section 21c, 22c, or 23c, and the light transmitting section 21e, 22e, or 23e extending from the light receiving section 21a, 22a, or 23a toward the light output section 21c, 22c, or 23c. The light shielding section 27 has formed therein the light output openings 27a, 27c, and 27e, inside which the light output section 21c, 22c, or 23c is formed, and the light receiving openings 27b, 27d, and 27f, inside which the light receiving section 21a, 22a, or 23a is formed. The inner peripheral edges 27g, 27i, and 27k of the light output openings 27a, 27c, and 27e are entirely in contact with the light output section 21c, 22c, or 23c. The light transmitting sections 21e, 22e, and 23e have the exterior surface or surfaces (21g, 22g to 22k, or 23g to 23k) extending in the extending direction of the light transmitting section 21e, 22e, or 23e and exposed from the light shielding section 27.

With this structure, the amount of light leakage from the light output sections 21c, 22c, and 23c in an unintended direction can be reduced. Further, since the light transmitting sections 21e, 22e, and 23e have the exterior surface or surfaces (21g, 22g to 22k, or 23g to 23k) exposed from the light shielding section 27, light from the light sources S1, S2, and S3 can efficiently be guided from the light receiving section 21a, 22a, or 23a to the light output section 21c, 22c, or 23c.

The light transmitting sections 22e and 23e have the lower surface 22g or 23g and the upper surface 22h or 23h exposed from the light shielding section 27. With this, light from the light sources S1, S2, and S3 can efficiently be guided from the light receiving section 21a, 22a, or 23a to the light output section 21c, 22c, or 23c.

The light transmitting sections 22e and 23e have the lower surface 22g or 23g, the upper surface 22h or 23h, and the outer curved surface 22i or 23i exposed from the light shielding section 27. With this, light from the light sources S1, S2, and S3 can more efficiently be guided from the light receiving section 21a, 22a, or 23a to the light output section 21c, 22c, or 23c.

The light transmitting sections 22e and 23e have the inner curved surface 22k or 23k extending in the extending direction of the light transmitting section 22e or 23e. The inner curved surfaces 22k and 23k are fixed to the light shielding section 27. With this, the light guiding frame 20 and the light guiding sections 22 and 23 can have increased strengths.

When the cross section of the light transmitting section 22e or 23e on the plane orthogonal to the extending direction of the light transmitting section 22e or 23e is seen, half or more of the outer peripheral edge of the cross section is exposed from the light shielding section 27. That is, "W1+W2+W3>L/2" may hold as described with reference to FIG. 11B.

The inner peripheral edges 27h and 27j of the light receiving openings 27b and 27d are entirely in contact with the light receiving section 21a or 22a. The amount of unintended light leakage inside the input device 10 can be reduced.

The light output sections 21c, 22c, and 23c are protrusions respectively fitted into the light output openings 27a, 27c, and 27e. The inner peripheral surfaces of the light output openings 27a, 27c, and 27e are in close contact with the outer peripheral surface of the light output section 21c, 22c, or 23c. This allows the light emitting sections E1, E2, and E3 to emit light effectively. Further, the light output sections 21c, 22c, and 23c can be firmly fixed to the light output opening 27a, 27c, or 27e.

The light shielding section 27 has the light shielding walls 27t and 27u formed between the adjacent two light receiving openings 27b and 27d (27d and 27f) and protruding over the light receiving sections 21a, 22a, and 23a. This makes it possible to prevent, for example, light from the first light source S1 from entering the light receiving section 22a of the second light guiding section 22 and light from the second light source S2 from entering the light receiving section 21a of the first light guiding section 21.

The distance from the level of the light receiving surfaces 21b, 22b, and 23b to the level of the end portions of the light shielding walls 27t and 27u is larger than the distance from the level of the light receiving surfaces 21b, 22b, and 23b to the level of the light sources S1, S2, and S3. This makes it possible to more effectively prevent, for example, light from the first light source S1 from entering the light receiving section 22a of the second light guiding section 22 and light from the second light source S2 from entering the light receiving section 21a of the first light guiding section 21.

Other Examples

Note that, the structure proposed in an embodiment of the present disclosure may be applied to electronic apparatuses other than input devices (for example, video game consoles, PCs, and audiovisual apparatuses).

Further, the input device 10 includes the light guiding frame 20 of the input pad Pd as a light guiding member provided with the light guiding sections 21, 22, and 23. However, a light guiding member provided with the light guiding sections 21, 22, and 23 may be a portion of the exterior member of an electronic apparatus instead of the input member thereof, for example.

Further, the number of light guiding sections of a light guiding member (light guiding frame) is not necessarily three. That is, the structure of the light guiding frame 20 proposed in an embodiment of the present disclosure may also be applied to a light guiding member with only one light guiding section.

It should be understood by those skilled in the art that various modifications, combinations, sub-combinations and alterations may occur depending on design requirements and other factors insofar as they are within the scope of the appended claims or the equivalents thereof

What is claimed is:

1. An electronic apparatus comprising:
   a light source;
   a light emitting section configured to emit light from the light source to outside of the electronic apparatus; and
   a light guiding member including a light guiding section and a light shielding section that are formed by two-color molding,
   wherein the light guiding section comprises:
   a light receiving section configured to receive the light from the light source,
   a light output section configured to output the light toward the light emitting section, and
   a light transmitting section extending from the light receiving section toward the light output section,
   the light shielding section has formed therein a first opening, wherein an inner peripheral edge of the first opening is in contact with a first section that is one of the light receiving section and the light output section, and the light transmitting section comprises an exterior surface extending in an extending direction of the light transmitting section and exposed from the light shielding section.

2. The electronic apparatus according to claim 1, wherein
the exterior surface of the light transmitting section includes a plurality of surfaces extending in the extending direction of the light transmitting section,
the plurality of surfaces include a first surface and a second surface facing in a direction opposite to a direction of the first surface, and
the first surface and the second surface are exposed from the light shielding section.

3. The electronic apparatus according to claim 2, wherein
the exterior surface of the light transmitting section includes the first surface, the second surface, a third surface facing in a direction different from the direction of the first surface and the direction of the second surface, and a fourth surface facing in a direction opposite to the direction of the third surface, and
at least three of the first surface, the second surface, the third surface, and the fourth surface are exposed from the light shielding section.

4. The electronic apparatus according to claim 1, wherein the exterior surface of the light transmitting section includes a surface extending in the extending direction of the light transmitting section and fixed to the light shielding section.

5. The electronic apparatus according to claim 1, wherein, when a cross section of the light transmitting section on a plane orthogonal to the extending direction of the light transmitting section is seen, half or more of an outer peripheral edge of the cross section is exposed from the light shielding section.

6. The electronic apparatus according to claim 1, wherein an entire periphery of the inner peripheral edge of the first opening is in contact with the first section.

7. The electronic apparatus according to claim 1, wherein
the light shielding section has formed therein a second opening, and
an inner peripheral edge of the second opening is in contact with a second section that is the other of the light receiving section and the light output section.

8. The electronic apparatus according to claim 1, wherein
the first section is a protrusion fitted into the first opening, and
the first opening has an inner peripheral surface in close contact with an outer peripheral surface of the protrusion.

9. The electronic apparatus according to claim 1, wherein the first opening is a light output opening inside which the light output section is formed.

10. The electronic apparatus according to claim 1, wherein the first opening is a light receiving opening inside which the light receiving section is formed.

11. The electronic apparatus according to claim 1, wherein
the light guiding member includes a plurality of the light receiving sections, and
the light shielding section has, as the first opening, a plurality of light receiving openings in which the respective plurality of light receiving sections are disposed.

12. The electronic apparatus according to claim 1, wherein the light shielding section has a light shielding wall formed between adjacent two light receiving openings and protruding over the light receiving section.

13. The electronic apparatus according to claim 12, wherein a distance from an end surface of the light receiving section to the light source is smaller than a distance from the end surface of the light receiving section to an end portion of the light shielding wall.

14. The electronic apparatus according to claim 1, wherein the electronic apparatus is an input device including a grip that a user holds.

15. The electronic apparatus according to claim 1, wherein the light guiding section is provided to an input member operable by a user with his/her finger.

16. A light guiding member comprising:
a light guiding section; and
a light shielding section,
wherein the light guiding section and the light shielding section are formed by two-color molding,
the light guiding section comprises:
a light receiving section configured to receive light from a light source,
a light output section configured to output the light toward a light emitting section, and
a light transmitting section extending from the light receiving section toward the light output section,
the light shielding section has formed therein a first opening, wherein an inner peripheral edge of the first opening is in contact with a first section that is one of the light receiving section and the light output section, and
the light transmitting section comprises an exterior surface extending in an extending direction of the light transmitting section and exposed from the light shielding section.

* * * * *